(12) United States Patent
Minor et al.

(10) Patent No.: US 8,264,770 B2
(45) Date of Patent: Sep. 11, 2012

(54) MULTI-PURPOSE PERISCOPE WITH DISPLAY AND OVERLAY CAPABILITIES

(75) Inventors: Jeffrey Wayne Minor, Lake Orion, MI (US); Henry Clarence Davies, Orion, MI (US); Edward Charles Schwartz, Rochester, MI (US); Michael James Klingensmith, Macomb, MI (US); Thomas Patrick Ryan, Ann Arbor, MI (US)

(73) Assignee: Oasis Advanced Engineering, Inc., Auburn Hills, MI (US)

( * ) Notice: Subject to any disclaimer, the term of this patent is extended or adjusted under 35 U.S.C. 154(b) by 0 days.

(21) Appl. No.: 12/800,447

(22) Filed: May 15, 2010

(65) Prior Publication Data
US 2011/0026090 A1 Feb. 3, 2011

Related U.S. Application Data

(63) Continuation-in-part of application No. 11/947,682, filed on Nov. 29, 2007, now Pat. No. 7,719,749.

(51) Int. Cl.
*G02B 23/08* (2006.01)
(52) U.S. Cl. ....................................... 359/402
(58) Field of Classification Search .................... 359/267
See application file for complete search history.

(56) References Cited

U.S. PATENT DOCUMENTS

| | | | |
|---|---|---|---|
| 2,361,050 A | 10/1944 | Paddock | |
| 3,692,388 A * | 9/1972 | Hall et al. | 359/275 |
| 4,672,435 A | 6/1987 | Gluck | |
| 5,134,519 A * | 7/1992 | Abele et al. | 359/405 |
| 5,691,789 A | 11/1997 | Li | |
| 5,695,682 A | 12/1997 | Doane | |
| 5,982,536 A | 11/1999 | Swan | |
| 6,359,673 B1 | 3/2002 | Stephenson | |
| 6,369,868 B1 | 4/2002 | Fan | |
| 6,630,974 B2 | 10/2003 | Galabova | |
| 6,633,354 B2 | 10/2003 | Li | |
| 6,674,504 B1 | 1/2004 | Li | |
| 6,710,823 B2 | 3/2004 | Faris | |
| 6,844,980 B2 | 1/2005 | He | |
| 7,056,119 B2 | 6/2006 | Cabato | |
| 2003/0129567 A1* | 7/2003 | Cabato et al. | 434/38 |
| 2003/0214631 A1* | 11/2003 | Svardal et al. | 353/8 |
| 2005/0007506 A1 | 1/2005 | Faris | |
| 2005/0057701 A1 | 3/2005 | Weiss | |

FOREIGN PATENT DOCUMENTS

| | | |
|---|---|---|
| DE | 102006062262 A1 | 6/2008 |
| EP | 0225818 | 11/1986 |
| EP | 1335231 A1 | 8/2003 |
| WO | 00/63745 | 4/2000 |
| WO | 2007/029137 A1 | 3/2007 |

* cited by examiner

*Primary Examiner* — James Jones
(74) *Attorney, Agent, or Firm* — Raggio & Dinnin, P.C.

(57) ABSTRACT

A collimated periscope that is switchable between a normal optical view of the outside, a display view, and an overlay view in which the outside view and display view are combined. The switching element is an electronically switchable mirror with primarily reflective, primarily transparent, and intermediate states, depending on the application of electrical potentials.

32 Claims, 18 Drawing Sheets

MULTI-PURPOSE PERISCOPE WITH DISPLAY AND OVERLAY CAPABILITIES

CROSS-REFERENCE TO RELATED APPLICATIONS

This is a continuation in part application of Ser. No. 11/947,682, filed Nov. 29, 2007 now U.S. Pat. No. 7,719,749.

FEDERALLY SPONSORED RESEARCH

The US Government has Government Purpose Rights to portions of this invention.

SEQUENCE LISTING OR PROGRAM

Not Applicable

BACKGROUND OF THE INVENTION

1. Field of Invention

This invention relates to optical periscopes with integrated video display capabilities.

2. Prior Art

Optical periscopes as described in U.S. Pat. No. 2,361,050 have been in use on ground combat vehicles such as tanks and infantry vehicles for many years. These periscopes are generally wide field of view devices composed mainly of solid glass or acrylic prisms with mirrored surfaces. A cross-section of a conventional periscope is shown in FIG. 1. The armor of the vehicle is represented by 170. Periscopes can be designed to be inserted from outside or inside the vehicle. The variety shown is inserted from the inside. The periscope is enclosed in a metal housing 130. A suitable elastic material such as a two-part Room Temperature Vulcanized (RTV) rubber 190 is used to secure and cushion the optics within the housing. Periscopes generally have an upper prism 110 and a lower prism 120 with reflective coatings on angled surfaces 115 and 125 respectively. The prisms are generally separated by gap 135 containing air, an inert gas, or a vacuum (U.S. Pat. No. 4,149,778), or a transparent elastic solid (U.S. Pat. No. 4,065,206). The purpose of the gap is to isolate the lower prism 120 from the shock of a ballistic impact on the upper portion of the periscope. Frequently there is a laser filter 140, which can be placed as shown at the entrance face, in the air gap, or at the exit face. The function of the filter is to protect the crewmember's eyes from laser damage while using the periscope. A protective faceplate 150, commonly composed of polycarbonate or other transparent shatter-resistant material, is often placed at the exit face of the periscope to prevent pieces of shattered glass or acrylic from entering the crew compartment in the event of a ballistic impact on the periscope. Light 180 from outside of the vehicle enters the periscope at the entrance face, reflects off reflective coating 115, reflects off reflective coating 125, exits the periscope at the exit face, and is visible by the eye of the crewmember 160. Conventional periscopes are used by crewmembers to drive, acquire targets, maintain situational awareness, and perform similar tasks, while staying within the protection of the vehicle's armor. Such periscopes often include a blind as described in U.S. Pat. No. 4,033,677 which blocks light inside the vehicle from exiting through the periscope where it could be detected by opposing forces.

The skills involved in operating a ground combat vehicle have historically been trained in a simulator or by live exercises. Over the last decade, significant research has been performed to develop the capability to perform virtual training using the actual vehicle but not requiring movement of the vehicle or firing of actual weapons. This capability is referred to as Embedded Training. For example, embedded gunnery training has been demonstrated in the Abrams Main Battle Tank and Bradley Infantry Fighting Vehicle wherein synthetic imagery was electronically injected into the Forward Looking Infrared (FLIR) sights and the vehicle's controls were used by the crewmembers to engage the simulated targets. Noteworthy as these demonstrations were they underscored the limitations to current approaches to embedded training. Two major shortcomings were the inability to use the periscopes and other optical sights in the training and the inability to perform degraded mode training. The present invention addresses the optical sight shortcoming by integrating a display capability into the periscope.

In addition to enhancing embedded training capabilities a periscope with display capability can also be used as a general purpose display for displaying vehicle data or imagery from sensors or cameras during combat operations or vehicle maintenance functions.

The invention of U.S. Pat. No. 4,672,435 describes an array of displays placed in a circular pattern around the observer for displaying the imagery from a camera mounted in the proper azimuth position on a rotating platform. This method of displaying imagery has the intrinsic problem of introducing displays into an already space constrained vehicle compartment.

The invention of U.S. Pat. No. 5,982,536 improves upon the concept of U.S. Pat. No. 4,672,435 by integrating the display with the periscopes. However, the integration is by static combiner elements which inevitably involve compromises in performance. Specifically, a large portion of the outside light is lost when the device is used to provide an optical view of the outside world and a large portion of the display light is wasted when the device is used to provide a display image.

U.S. Pat. No. 6,844,980 describes an invention in which an electronically controllable image combiner is used to superimpose a display image in the user's line of sight when the combiner is in one electrical state and allows the user to see through the combiner when in another electrical state. However, this invention is defined as a thin substrate positioned generally normal to the direction of the user's line of sight, rather than being integrated into a periscope. Though this approach is an improvement over the static combiner method, it has inherent issues in that power must be continually applied when the image combiner capability is utilized and when power is removed, intentionally or through power failure, the combiner will cause the view to be degraded.

The invention of U.S. Pat. No. 7,056,119 is designed to provide an electronically controllable combination of images within a periscope through the use of electronic shutters and presumably static image combiners. As with the other inventions it too has intrinsic shortcomings, two of which are significant. First, the Polymer Dispersed Liquid Crystal (PDLC) technology used in the invention requires power to make it transparent, which is required when the outside view is desired. This implies that the device must be continuously powered in order for the crewmember to use the periscope in normal operation mode and that the loss of power will make the periscope unusable. The second failing is that the invention relies on Total Internal Reflection (TIR) and the elimination thereof by electronic means. Unfortunately the angles of incidence required to produce TIR do not permit the large field of view generally required of ground vehicle periscopes.

3. Objects and Advantages

Several objects and advantages of the present invention are:

a) provides for switching between outside view, display view, and a combination of the two within a periscope;
b) display view can be used to show a simulated scene for training purposes;
c) display view can be used to show vehicle data;
d) display view can be used to show video, e.g., from a daylight camera or FLIR;
e) combined view can be used to simultaneously show vehicle data and the outside view;
f) combined view can be used to simultaneously show symbology that is spatially correlated with the outside view (e.g., a target cue) and the outside view itself;
g) combined view can be used to simultaneously show sensor imagery (e.g., from a FLIR) in, for example, low light, obscuring weather, or obscuring smoke viewing conditions;
h) makes efficient use of space;
i) wastes very little of the outside or display light;
j) contains no moving parts which could wear out or jam;
k) failure modes return the device to the optical view of the outside;
l) design can be easily adapted to different size periscopes;
m) provides wide viewing angles;
n) can be permanently installed and used for both training and normal operations;
o) provides optional dimming of outside view;

SUMMARY

The present invention is a periscope that can be switched between the conventional optical view of the outside, a display image, and a combined (or overlay) view. The image switching is accomplished by a device with primarily reflective, primarily transparent, and intermediate states depending on the applied electrical potentials.

DRAWINGS

Figure 7A:
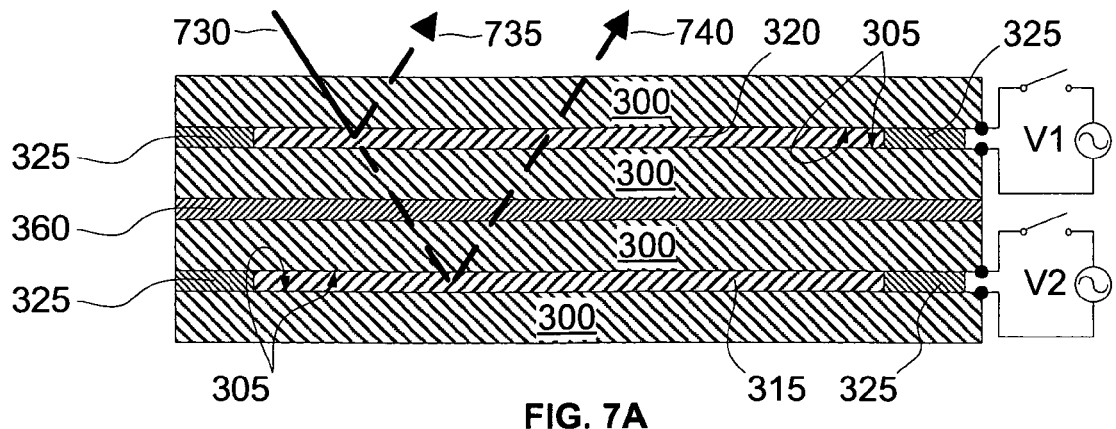
Figure 7B:
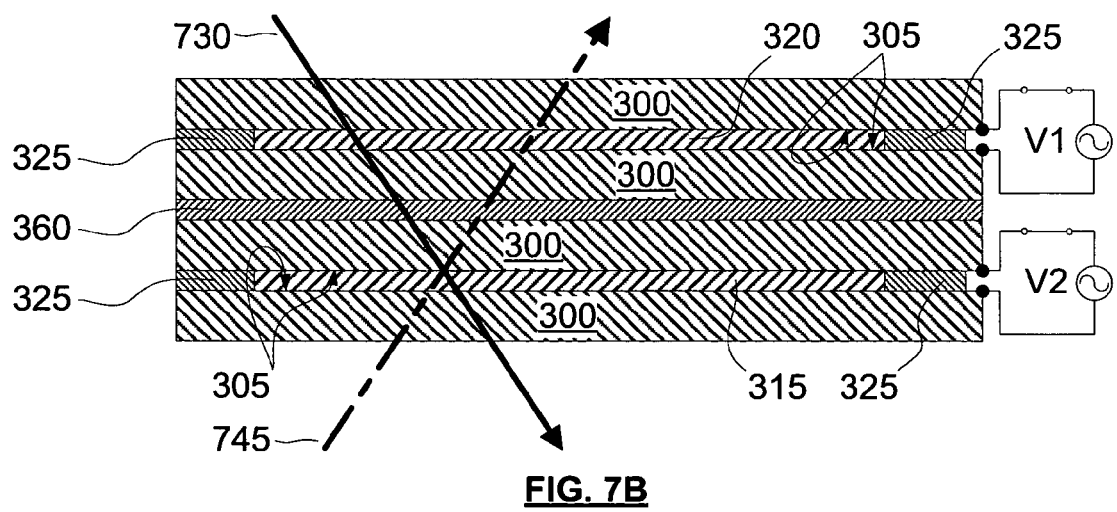
Figure 7C:
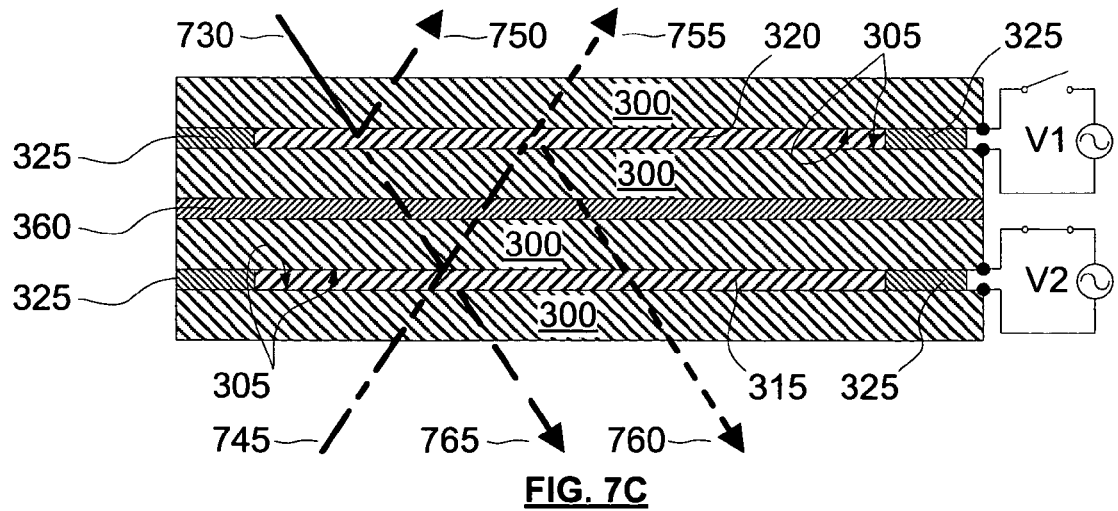

FIG. 7A, FIG. 7B, and FIG. 7C demonstrate the operation of the CLC ESM.

Figure 8:
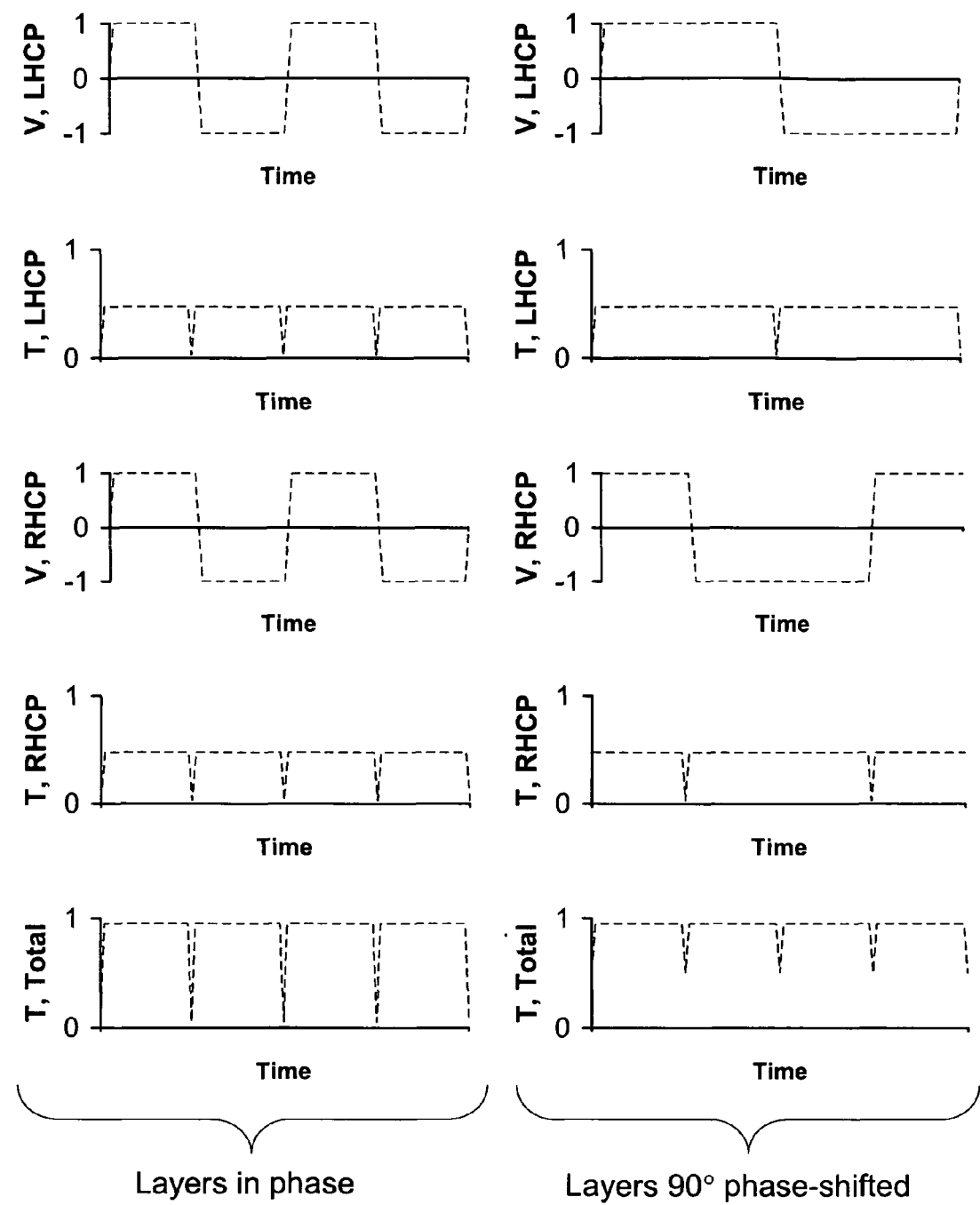

FIG. 8 shows plots of applied electrical potential and light transmission of the CLC ESM in its various states with in-phase and phase-shifted electrical drive schemes.

Figure 9:
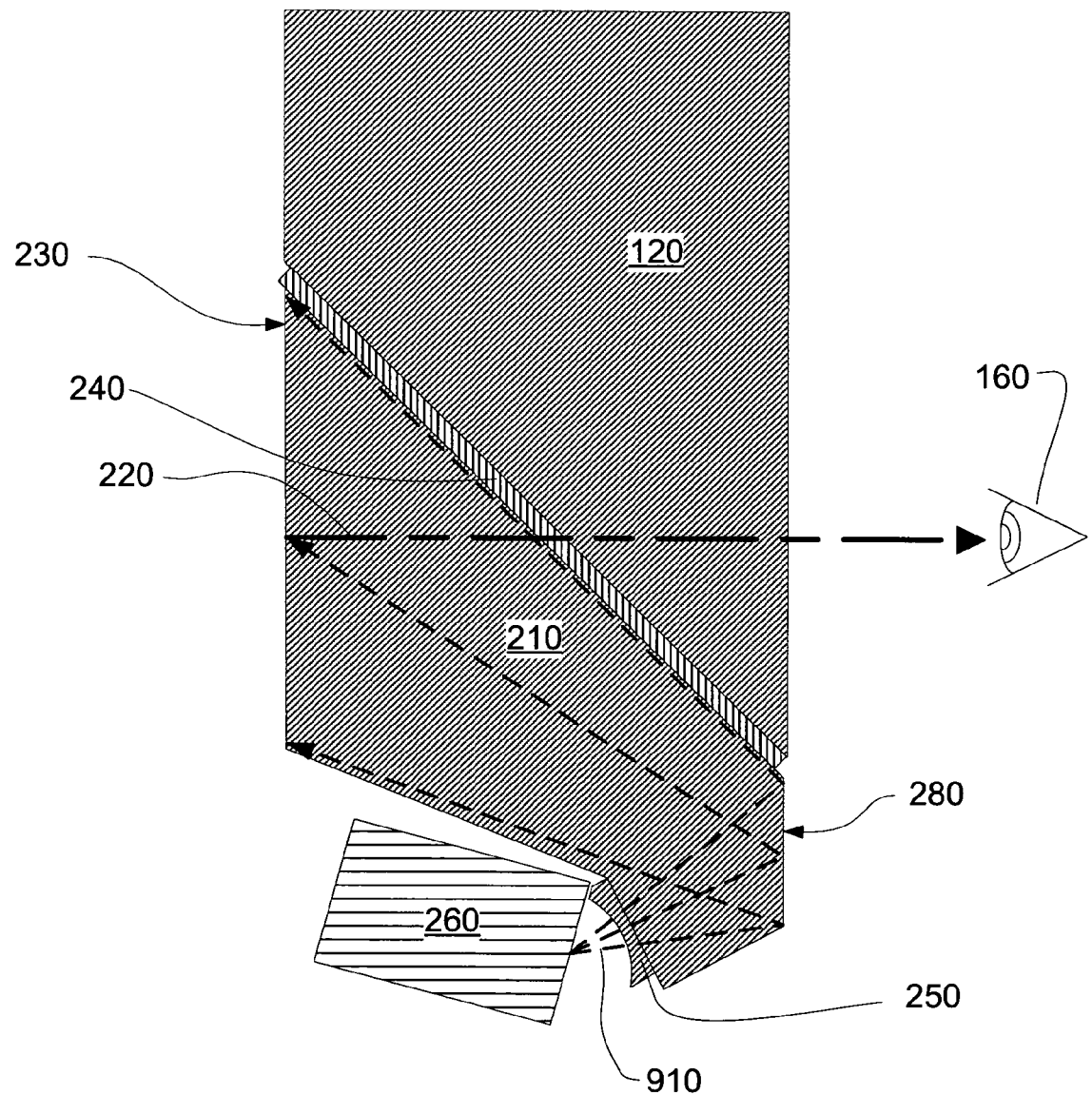

FIG. 9 shows the projection path.

Figure 10:
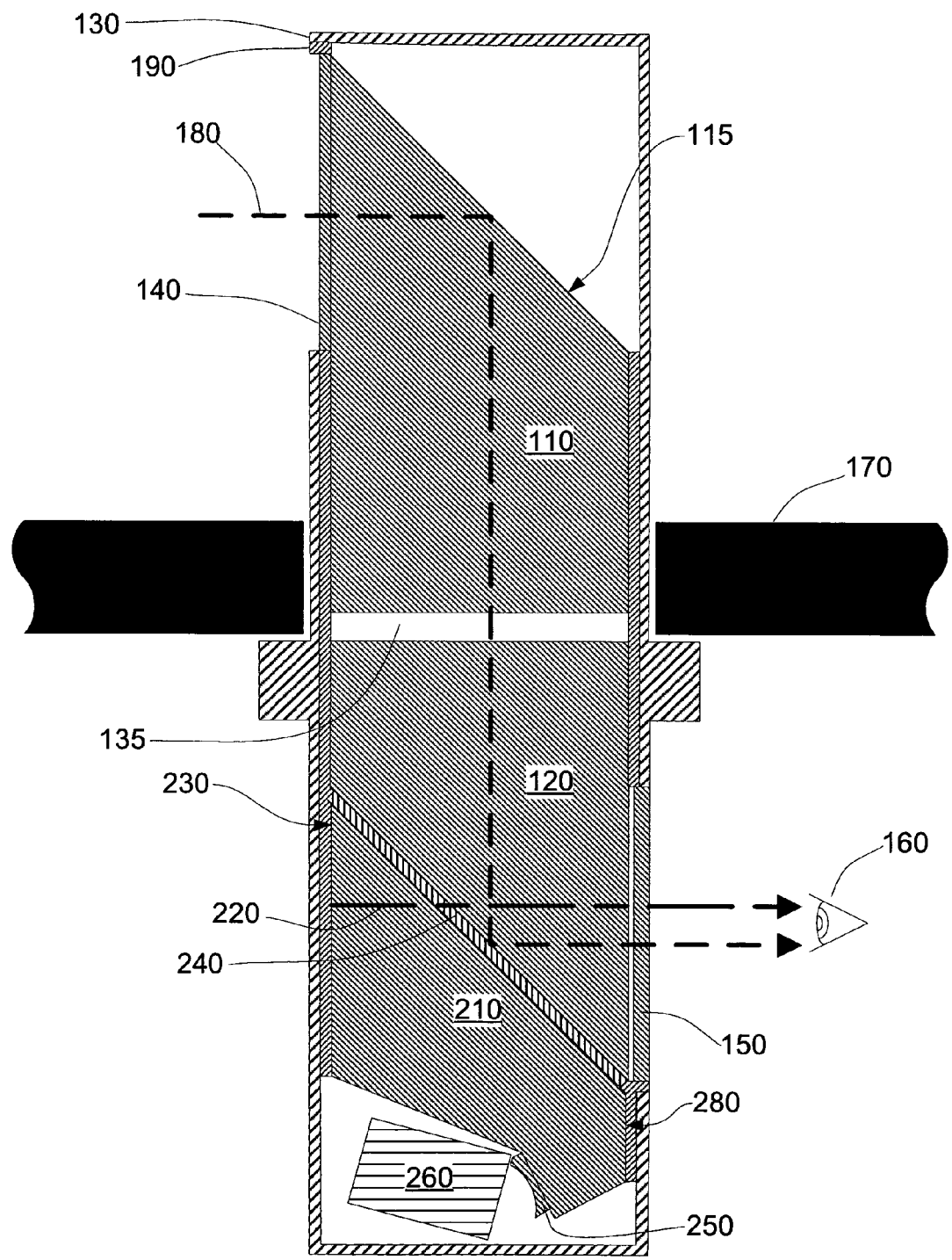

FIG. 10 shows a variant of the present invention with only one ESM.

Figure 11:
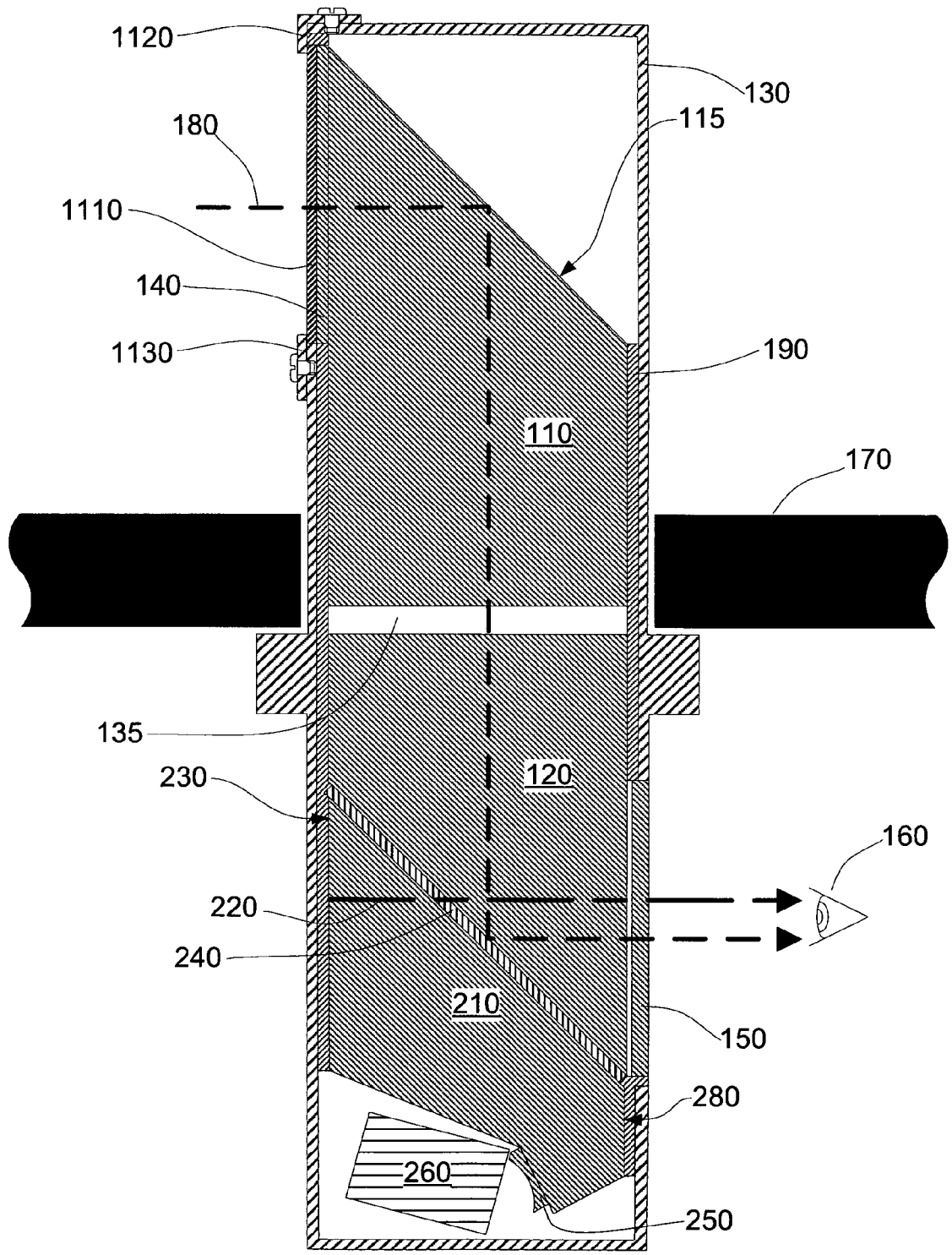

FIG. 11 shows a variant of the present invention with one ESM and one Electronically Switchable Shade (ESS).

Figure 12:
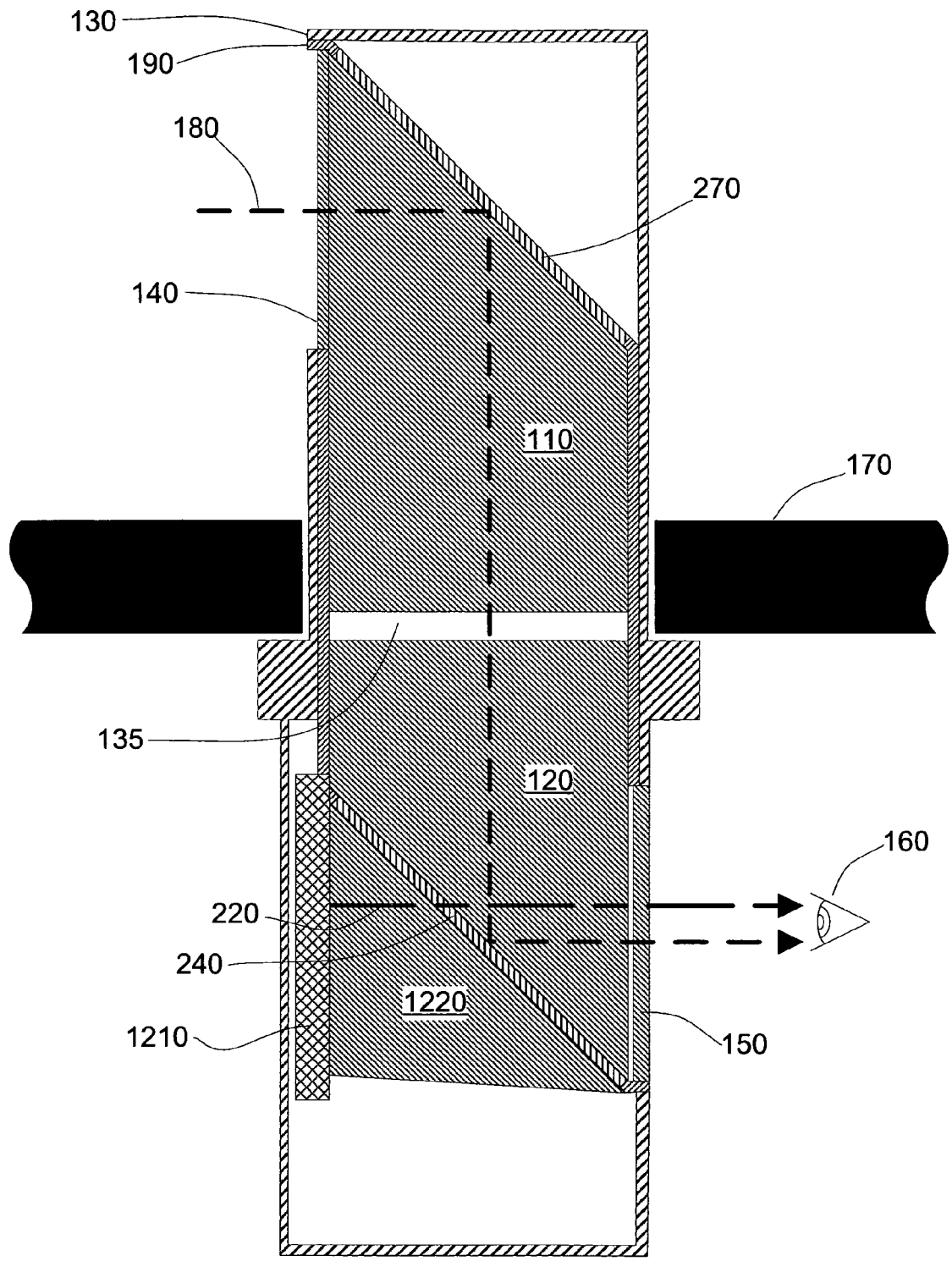

FIG. 12 shows a variant of the present invention with a Flat Panel Display (FPD).

Figure 13:
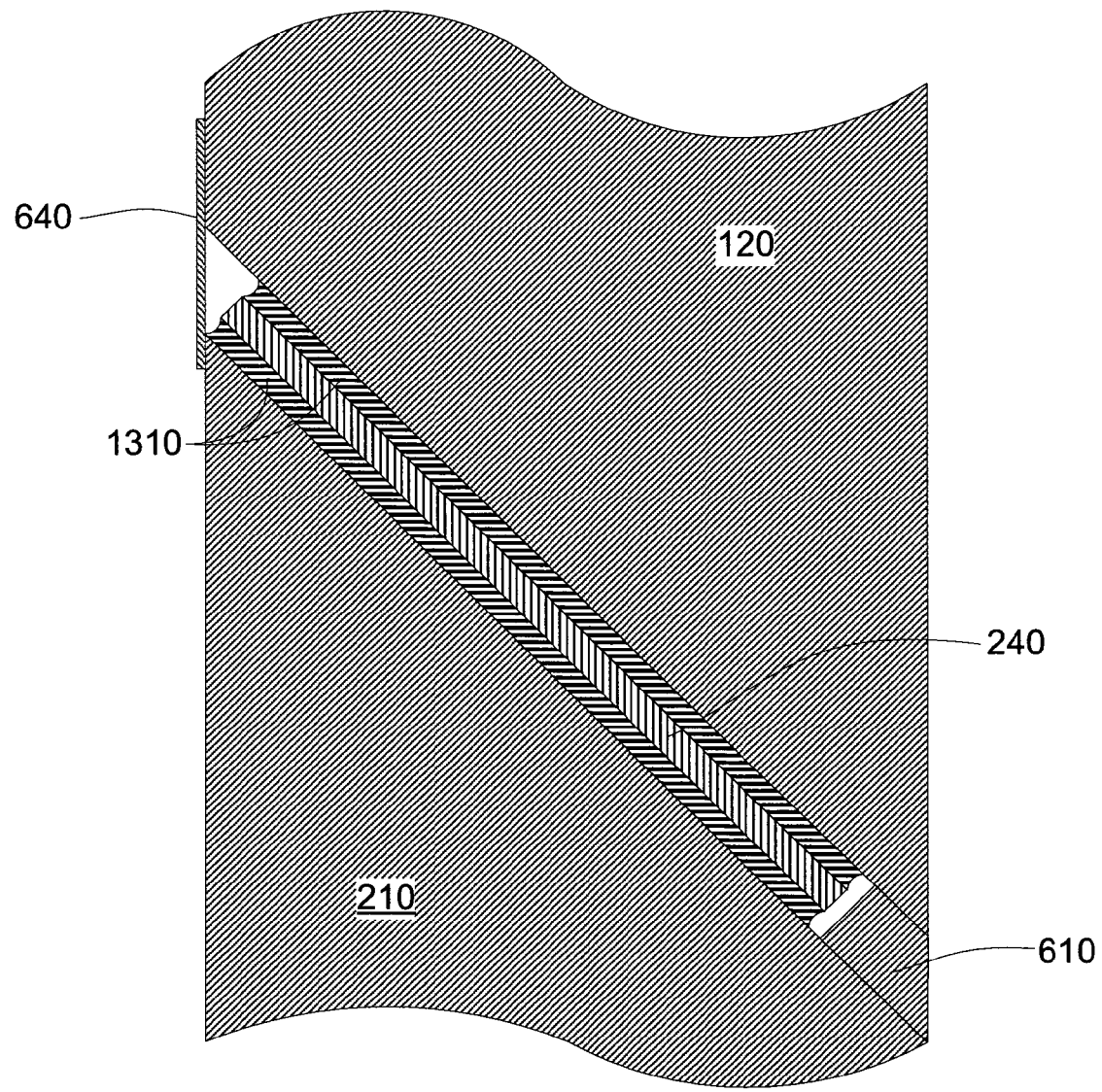

FIG. 13 shows an alternative lower ESM mounting.

Figure 14:
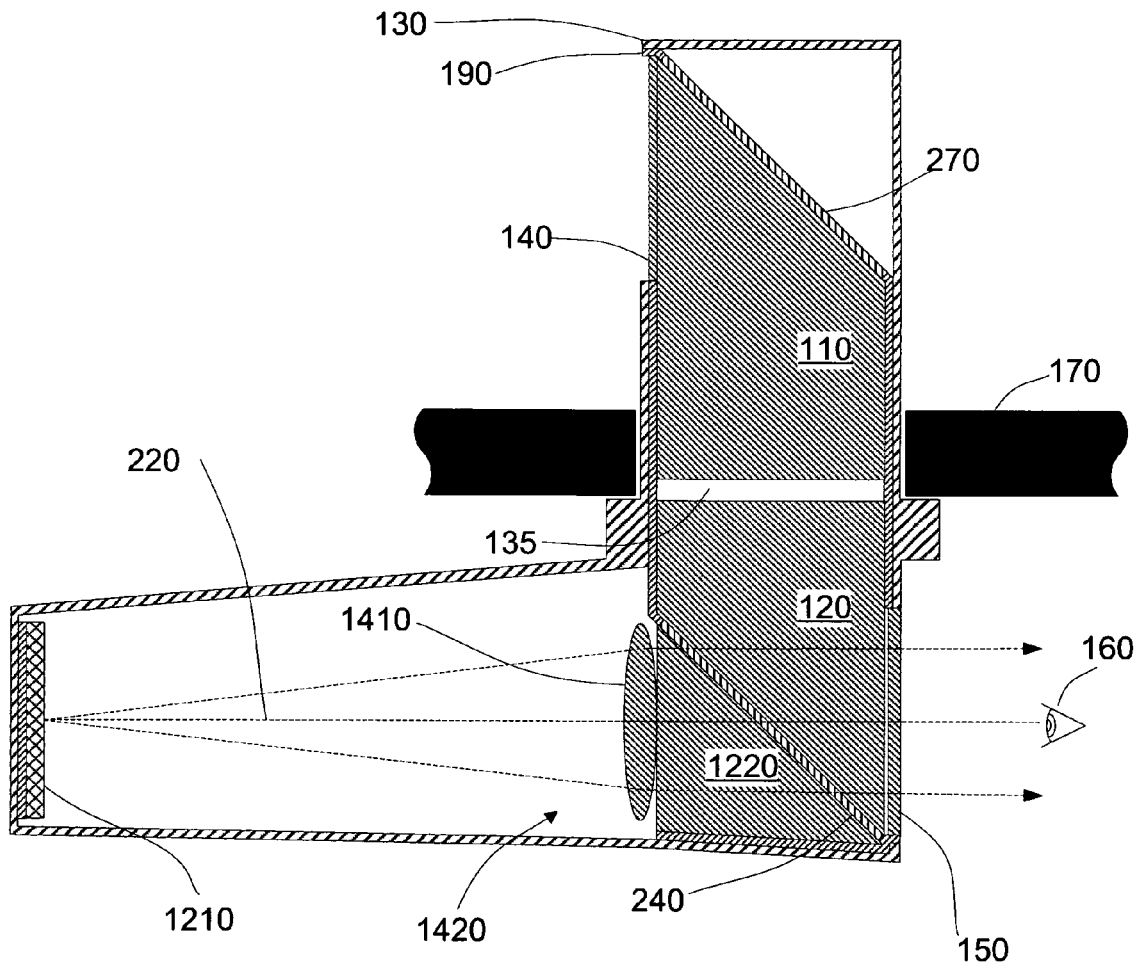

FIG. 14 shows a side view of an alternative embodiment of the present invention that includes a collimating optical assembly.

Figure 15A:
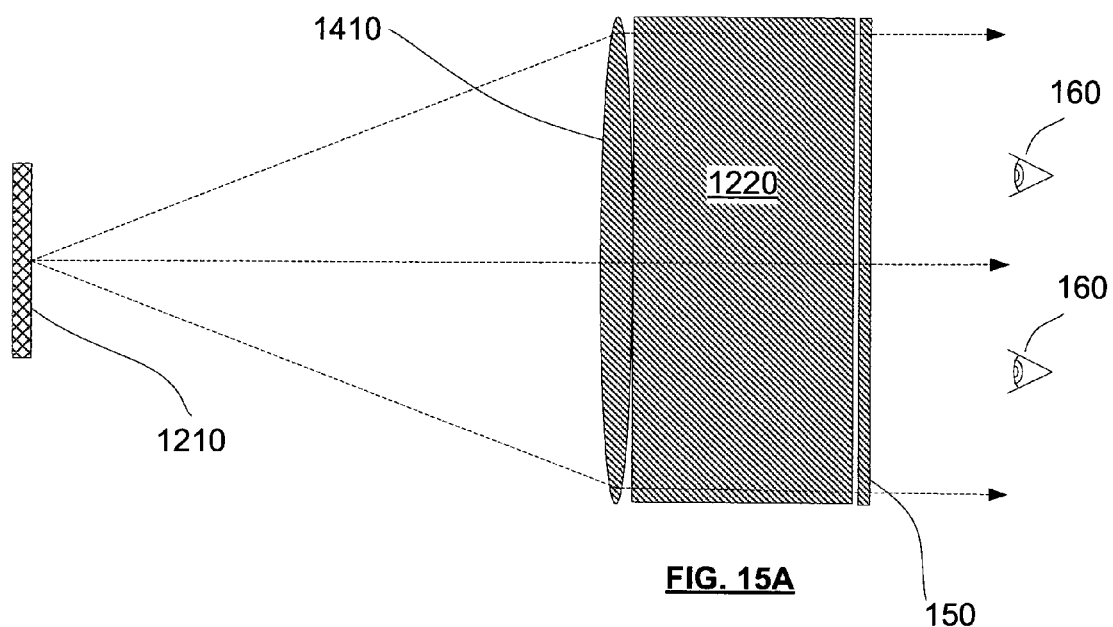

FIG. 15A shows a bottom view of the periscope according to FIG. 14.

Figure 15B:
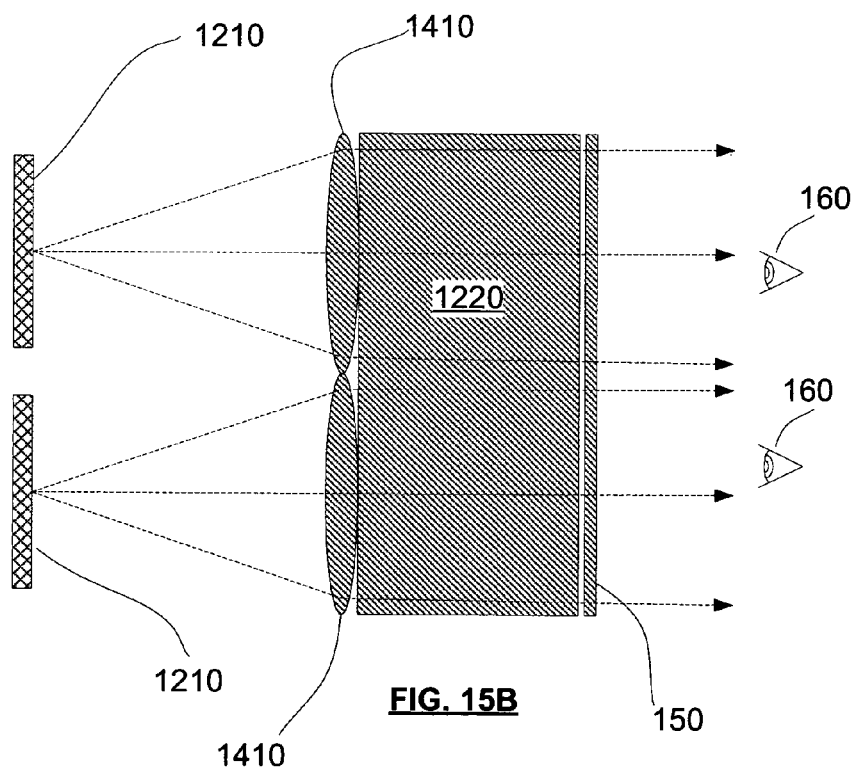

FIG. 15B shows a binocular embodiment of the periscope shown in FIG. 14.

Figure 16:
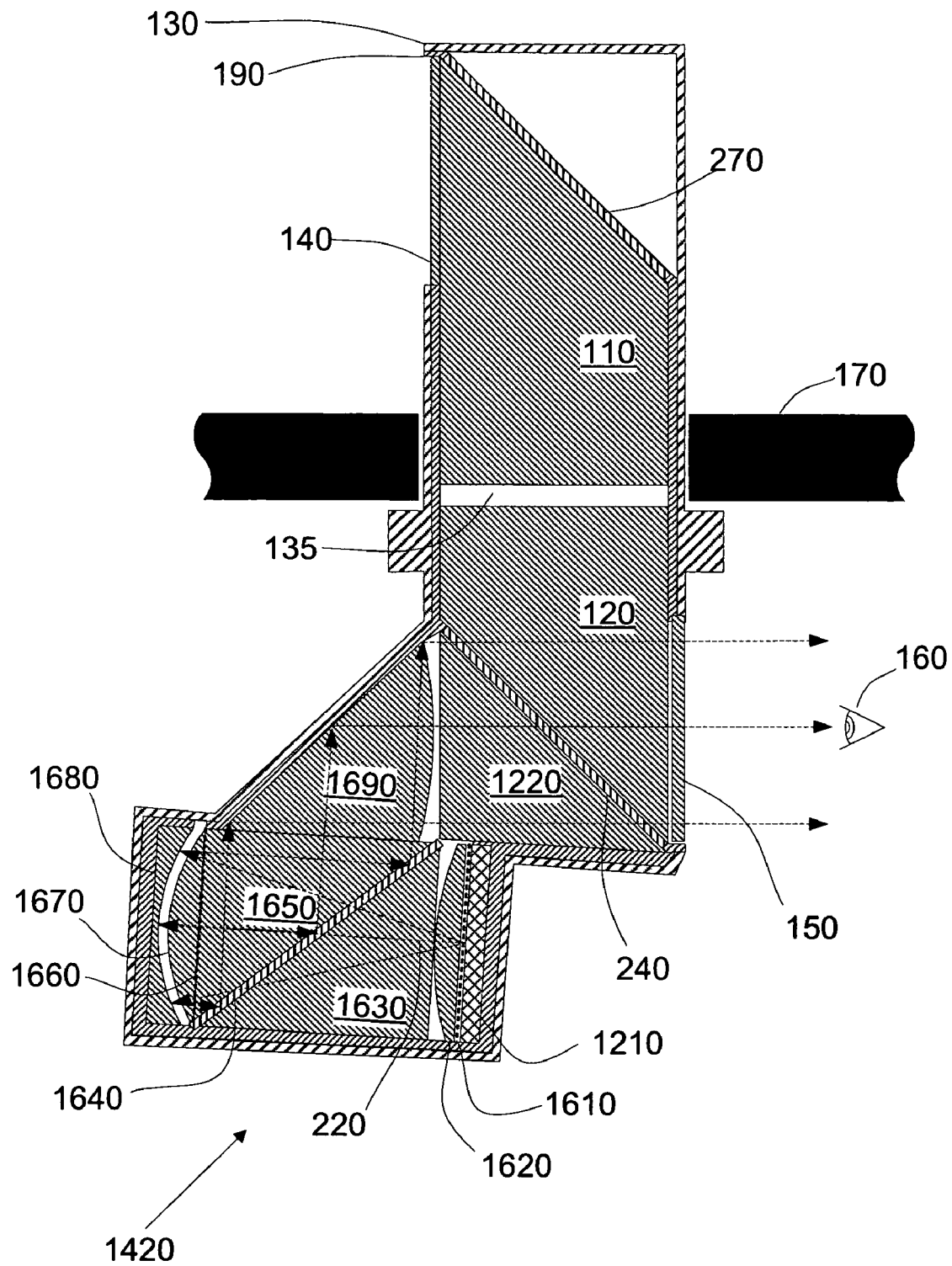

FIG. 16 shows a side view of an alternate embodiment of the periscope of the present invention having a collimating optical assembly.

Figure 17:
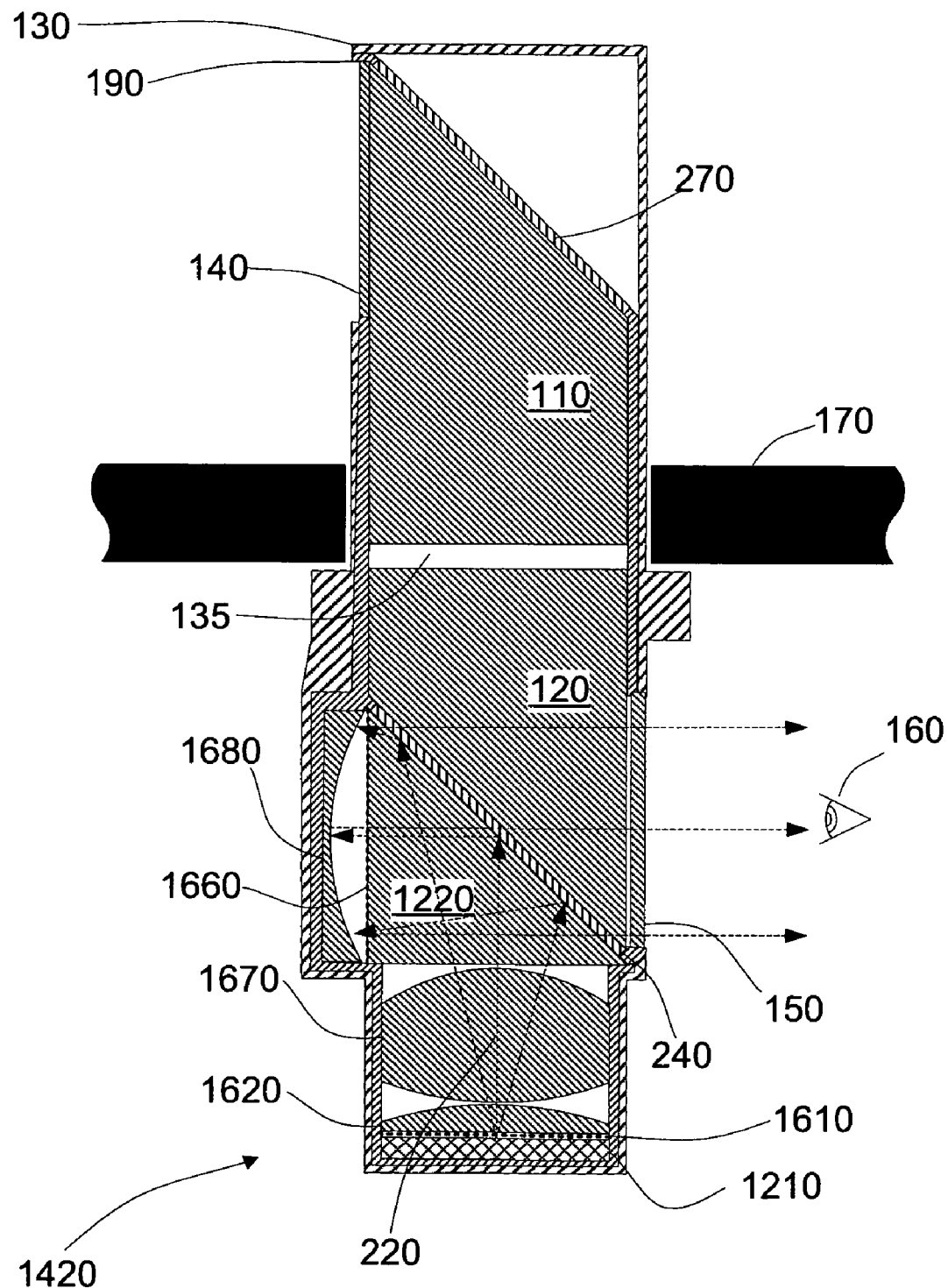

FIG. 17 shows a side view of an alternate embodiment of the present invention having a collimating optical assembly.

Figure 18:
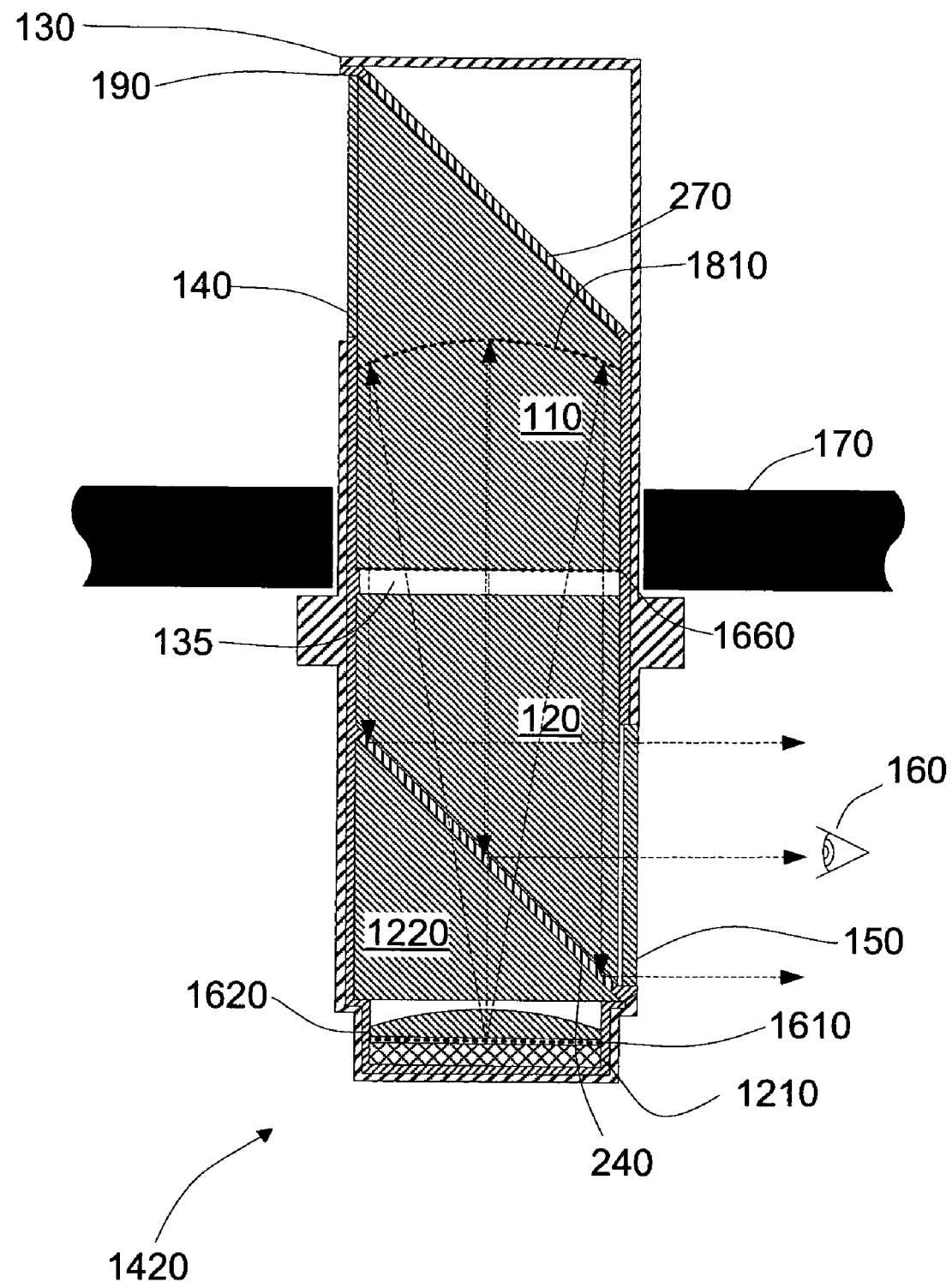

FIG. 18 shows a side view of an alternate embodiment of the periscope according to the present invention having a collimating optical assembly.

DETAILED DESCRIPTION—PREFERRED EMBODIMENT

Figure 1:
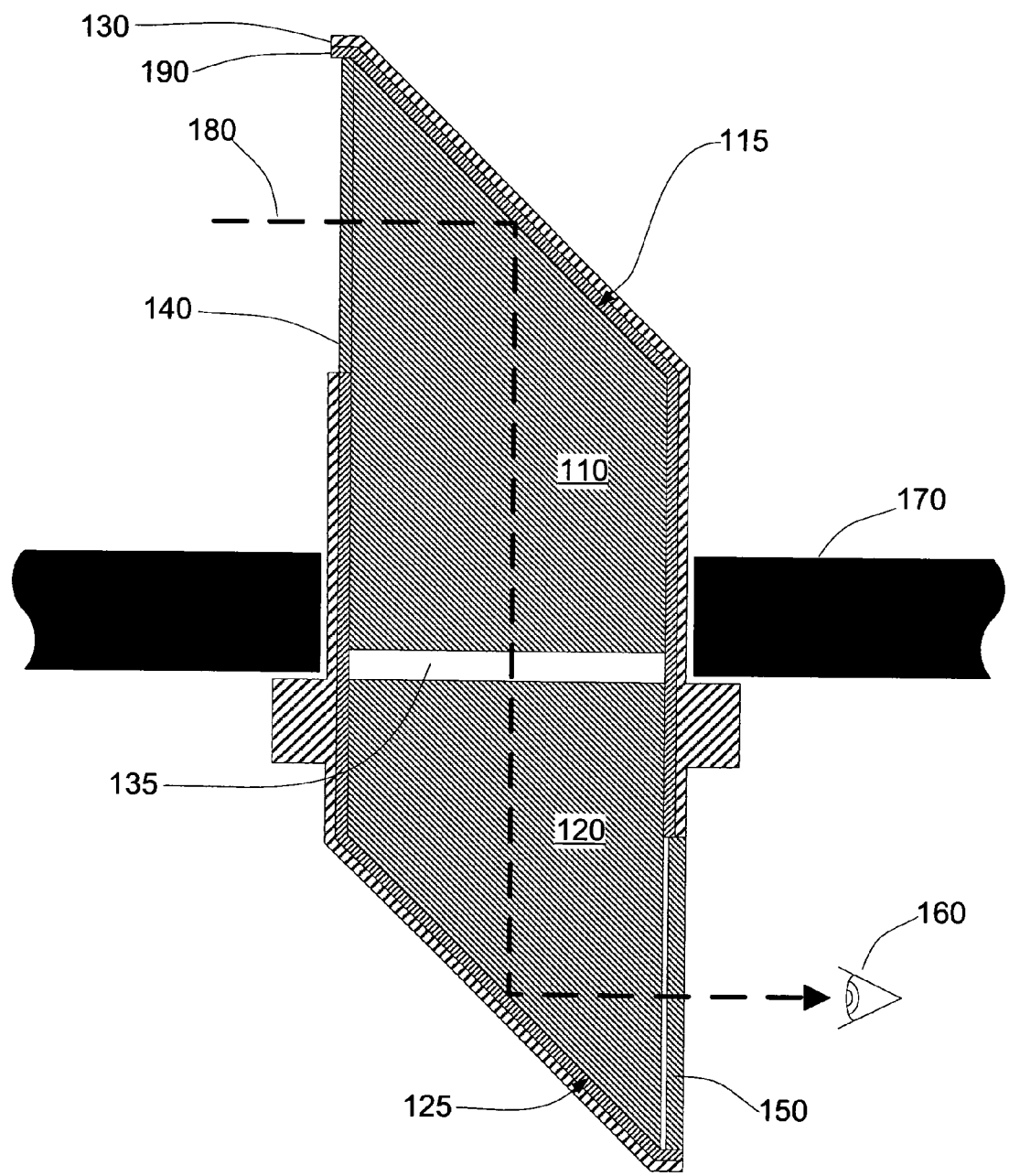
FIG. 1 shows a cross-section view of a prior art periscope.
Figure 2:
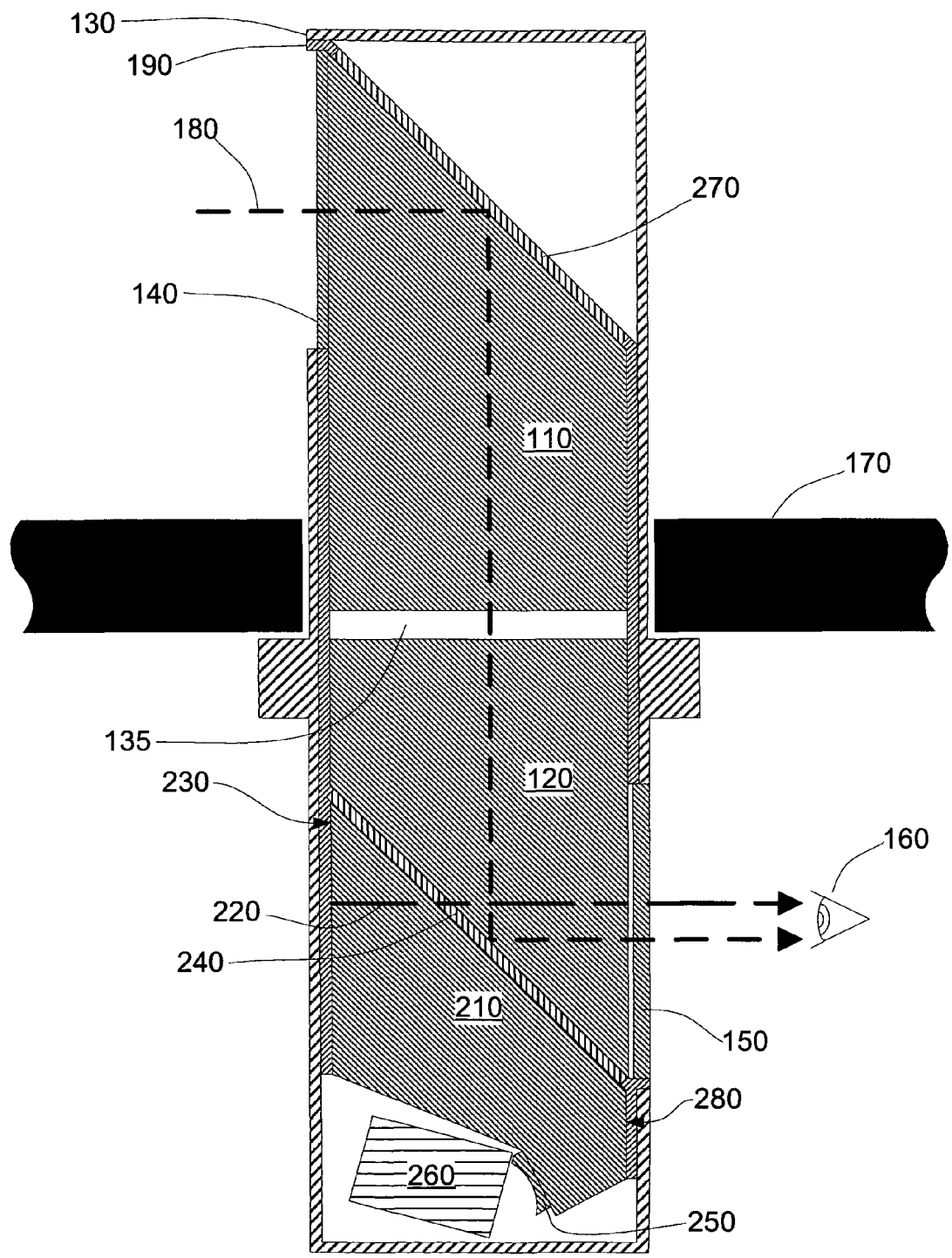
FIG. 2 shows a cross-section view of the preferred embodiment of the present invention.

The preferred embodiment of the present invention is shown in FIG. 2. The present invention includes many of the same components as the prior art periscope with several changes and additions. Projection prism 210 is added behind and below lower prism 120. The reflective coating on the angled face of the lower prism is replaced with lower Electronically Switchable Mirror (ESM) 240. The reflective coating of upper prism 110 has been replaced by upper ESM 270. The ESM is composed of two layers, each a Cholesteric Liquid Crystal (CLC) device as described in U.S. Pat. No. 6,674,504. One layer has a right-handed helix structure and reflects Right-Handed Circularly Polarized (RHCP) light. The other has a left-handed helix structure and reflects Left-Handed Circularly Polarized (LHCP) light. Projection screen coating 230 is applied to the indicated surface of projection prism 210. Projection screen coating 230 can be a paint intended for that purpose and widely available or some other suitable coating. Reflective coating 280 is applied to one surface of projection prism 210. Reflective coating 280 could be aluminum or other suitable coating. Projection lens 250 is glued to projection prism 210 using an appropriate clear adhesive such as an Ultra Violet (UV) curing epoxy. Projector 260 is mounted with the projection origin at the center of curvature of projection lens 250 and oriented so that the projected light enters projection lens 250. Housing 130 has been expanded to enclose these added components and provide space for the necessary electronics. Space for electronics is available above and to the right of upper ESM 270 and below projection prism 210. The exact size and shape of housing 130 will depend on the amount of space required for support electronics and the location of available space in the vehicle in the vicinity of the periscope.

Figure 3:
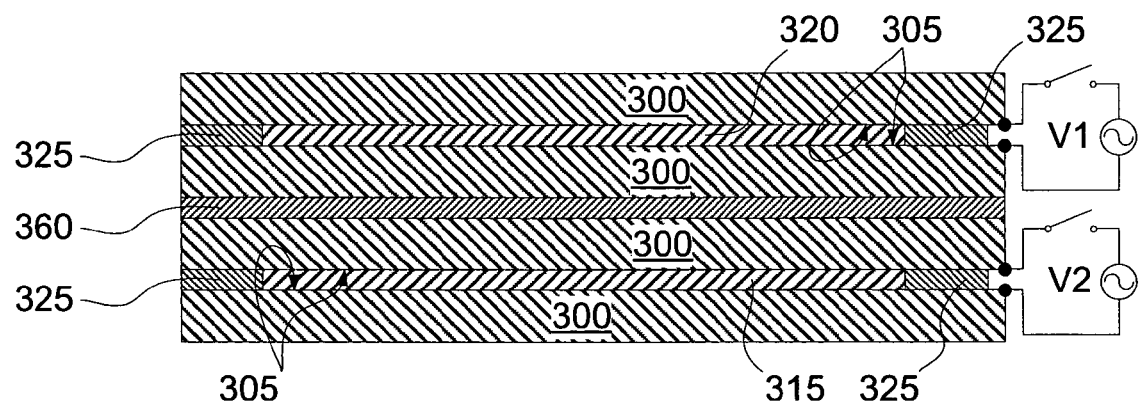
FIG. 3 shows cross-section views of the Cholesteric Liquid Crystal (CLC) Electronically Switchable Mirror (ESM).

FIG. 3 shows a cross-section of the Cholesteric Liquid Crystal (CLC) Electronically Switchable Mirror (ESM). The thicknesses of the different layers are not to scale to simplify the figure. The ESM consists of four glass substrates 300, each with transparent electrically conductive coating 305 composed of a material such as Indium Tin Oxide (ITO). Power sources V1 and V2 with switches are connected to transparent electrically conductive coatings 305. Layers of CLC material 320 and 315 are injected between pairs of the substrates. CLC layer 320 has a left-handed helical structure in its normal state. CLC layer 315 has a right-handed helical structure in its normal state. Such CLC helical structures have the property of reflecting circularly polarized light of the same handedness and of a wavelength corresponding to the pitch of the helix. The helical structures of CLC layers 320 and 315 vary in pitch through the thickness of the layer such that the full spectrum of visible light is reflected. A suitable transparent adhesive 325 such as UV-curing epoxy is used to seal the edges of the CLC layers. A similar transparent adhesive 360 is used to bond the inner substrates together.

Figure 4A:
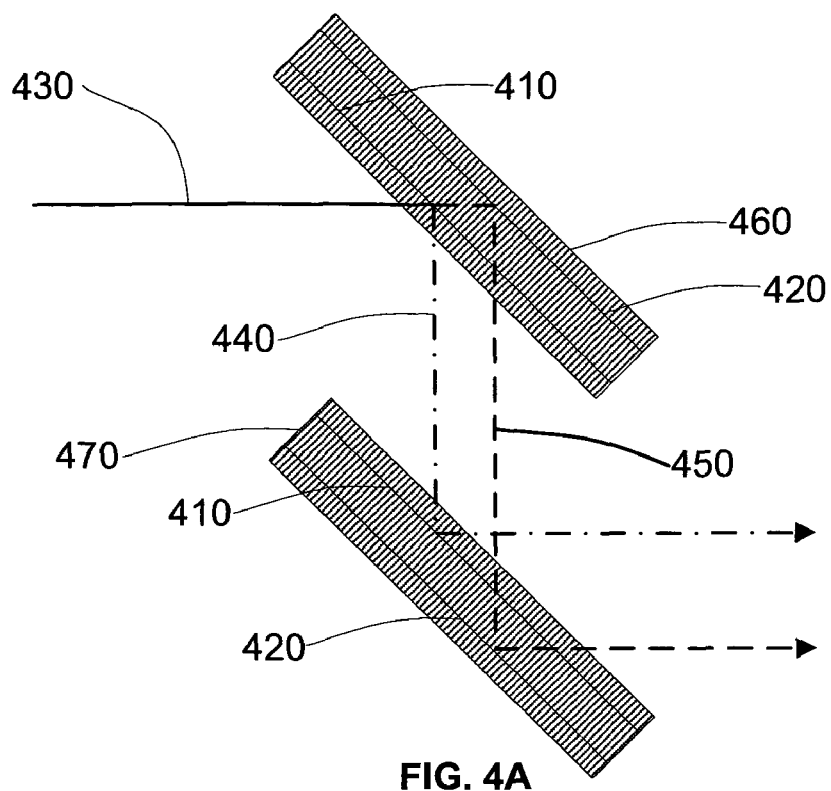
FIG. 4A and FIG. 4B show the effect of CLC ESM layer orientation on the double image issue.
Figure 4B:
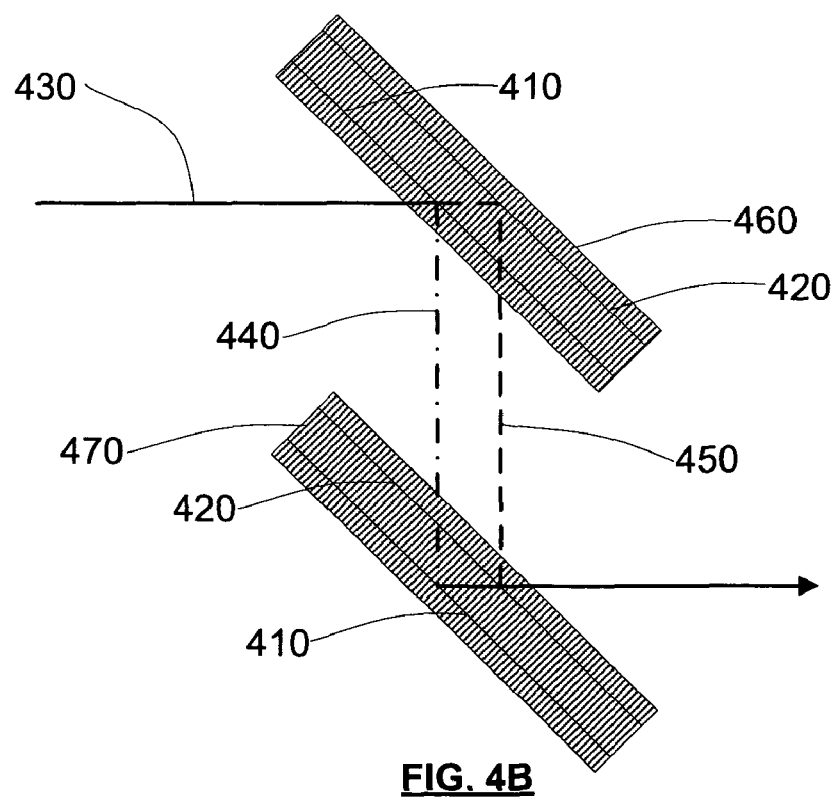

FIG. 4A and FIG. 4B depict the issue of a double image produced during conventional outside view mode due to the ESM being composed of two layers separated by a distance approximately twice the thickness of the substrates. Only the CLC ESMs and light rays are shown to simplify the figure. FIG. 4A represents the case in which the two CLC ESMs are oriented with their LHCP CLC layers 410 towards each other. The incident unpolarized ray of light 430 hits upper ESM 460 and most of the LHCP light is reflected by LHCP CLC layer 410 as represented by ray 440. The remaining light continues until it hits RHCP CLC layer 420 where the majority of the remaining light is reflected as represented by ray 450. The two rays 440 and 450 are now spatially separated by a distance approximately equal to the distance between the CLC layers divided by the cosine of the angle of incidence. Likewise, the two separate beams of light hit the two layers of lower ESM 470 where they are again reflected. This second reflection doubles the spatial offset of the two rays.

FIG. 4B represents the case in which the two CLC ESMs are oriented with the LHCP CLC layer 410 of one toward the RHCP CLC layer 420 of the other. The incident unpolarized ray of light 430 is split into two spatially offset rays due to the reflection off the two layers of the upper ESM as in FIG. 4A. However, the reversed orientation of the lower ESM causes the spatial offsets from the upper and lower ESMs to cancel each other out. FIG. 4B depicts the arrangement used in the preferred embodiment of the invention.

Figure 5:
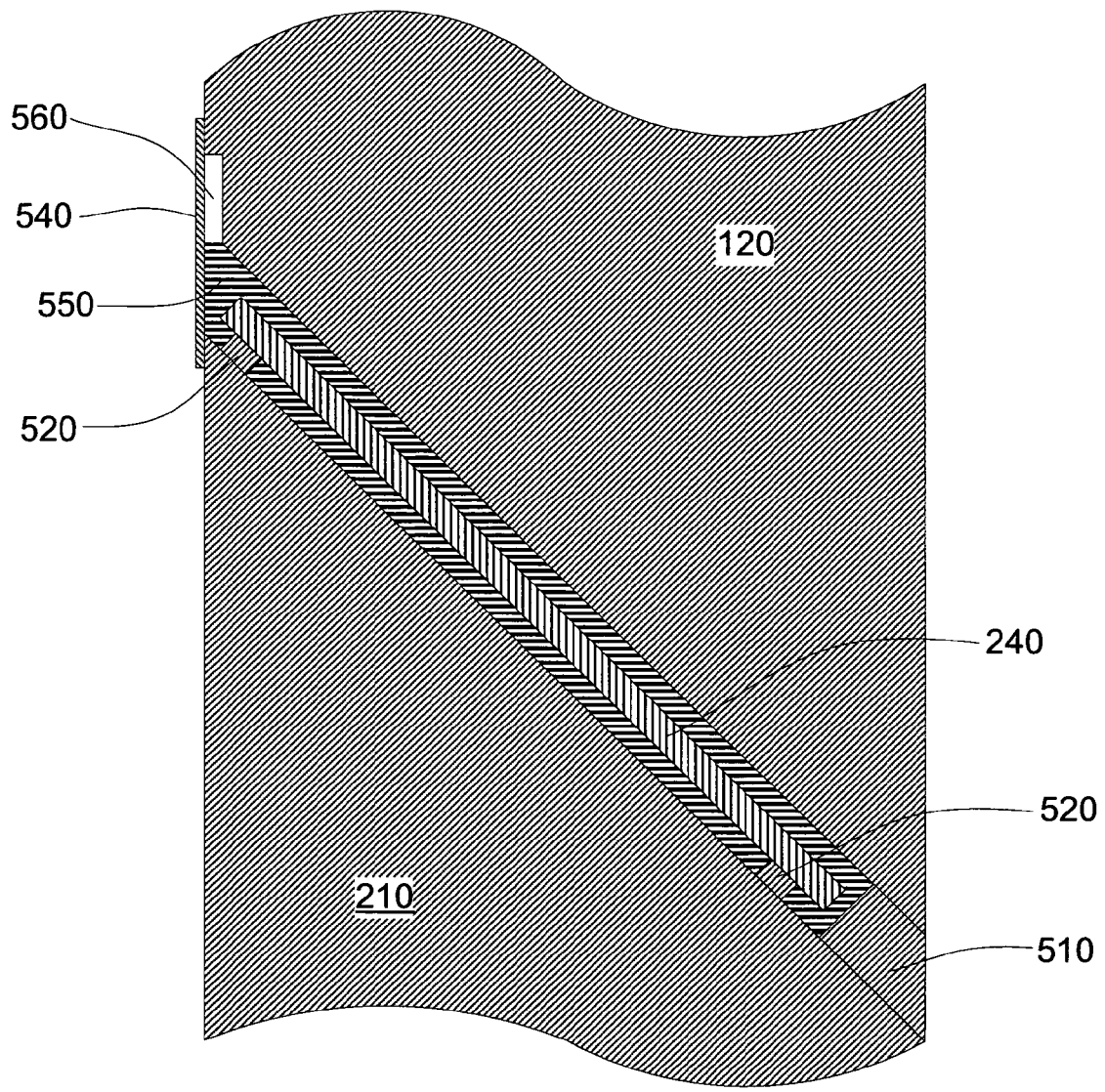
FIG. 5 shows the lower ESM mounting.

FIG. 5 is a side cross-section view of just the area of the lower ESM and depicts the lower ESM mounting method for the preferred embodiment of the invention. Only the lower prism 120, projection prism 210, lower ESM 240, and the ESM mounting and sealing provisions are shown for clarity. Four glass or acrylic spacers 520 are glued to lower ESM 240 using a transparent adhesive such as UV-curing epoxy. The four glass spacers are in turn glued to projection prism 210 using the same transparent adhesive. Lower seal 510 and similar side seals (not shown) are glued to projection prism 210 using transparent adhesive and lower prism 120 is then glued to the side seals and lower seal 510 using transparent adhesive. The resulting cavity surrounding lower ESM 240 is then filled with optical fluid or gel 550 having an index of refraction that closely matches that of the prisms, ESM substrates, and spacers 520. The cavity is not completely filled such that air space 560 remains. The air space 560 is sized to allow optical fluid or gel 550 to expand due to temperature without increasing the pressure of the fluid above the strength of the seals. Upper seal 540, composed of stainless steel or other suitable material, is then glued in place with a suitable adhesive, sealing the optical fluid within the cavity. Optical fluid or gel 550 around lower ESM 240 prevents internal reflections and insulates lower ESM 240 from the prisms so that it can be heated to operating temperature more quickly. Since lower prism 120 is attached to projection prism 210 without being directly attached to lower ESM 240, the ESM is isolated from physical shocks and vibrations.

Figure 6:
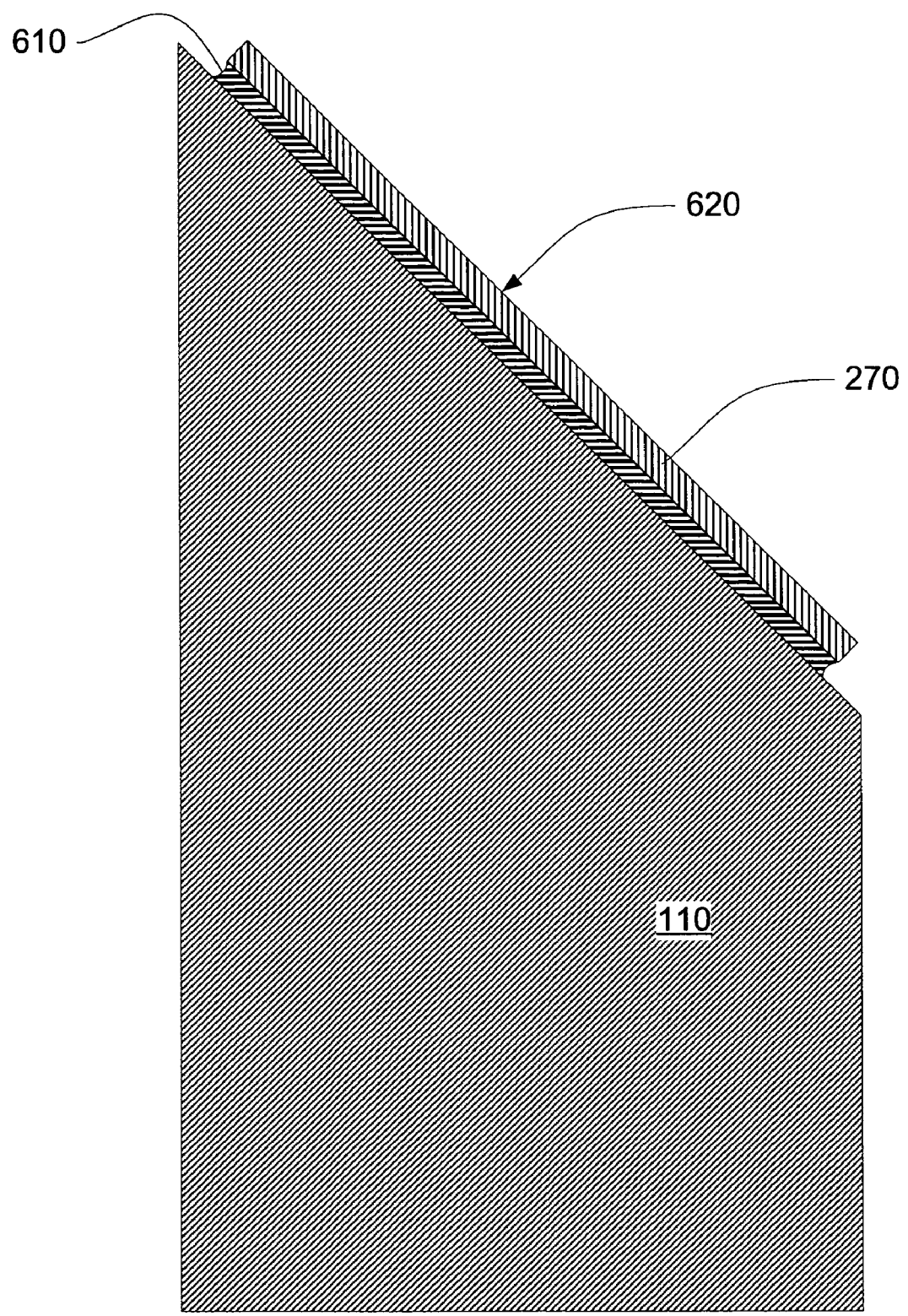
FIG. 6 shows the upper ESM mounting.

FIG. 6 is a side cross-section of just the area of the upper ESM and depicts the upper ESM mounting method for the preferred embodiment of the invention. Only the upper prism 110, upper ESM 270, and the ESM mounting provisions are shown for clarity. Since there is no prism on the upper side of upper ESM 270 with which an optical connection needs to be made, a simpler method can be used to mount the upper ESM. Upper ESM 270 is glued to upper prism 110 with a transparent adhesive 610 that is suitable for use in thick sections, has an index of refraction that closely matches that of the prism and ESM substrates, and is flexible. The flexibility of adhesive 610 allows it to adjust as upper prism 110 and upper ESM 270 expand differentially due to different coefficients of thermal expansion and uneven heating. The adhesive thickness is sized to allow sufficient differential thermal expansion and to insulate upper ESM 270 from upper prism 110 so it can be heated to operating temperature more quickly. A light-absorbing coating 620, such as black paint, is applied to upper ESM 270 to absorb light that is transmitted completely through the ESM.

OPERATION—PREFERRED EMBODIMENT

FIG. 7A, FIG. 7B, and FIG. 7C show identical cross-sections of the Cholesteric Liquid Crystal (CLC) Electronically Switchable Mirror (ESM) in different states. FIG. 7A represents the reflective state of the CLC ESM. Both layers of the ESM are in their naturally reflective state as there is no applied electrical potential V1 or V2. The incident outside light 730 enters the CLC ESM and hits Left-Handed Circularly Polarized (LHCP) CLC layer 320 where the LHCP portion 735 is reflected. The remaining portion of the light continues until it hits Right-Handed Circularly Polarized (RHCP) CLC layer 315 where the RHCP portion 740 of the light is reflected. A small portion of the incident light is not reflected by either CLC layer but this is not shown in the figure.

FIG. 7B represents the transparent state of the ESM. Both layers of the ESM are in their transparent state due to the application of electrical potentials V1 and V2. The electrical potential creates an electromagnetic field normal to the substrate surface and the liquid crystal particles align with that field, disrupting the helical structure which normally produces reflection. Incident outside light 730 passes completely through the CLC ESM. Incident light 745 from the display also passes completely through the CLC ESM.

FIG. 7C represents the intermediate state of the ESM. LHCP CLC layer 320 is reflective due to the lack of an electrical potential V1. RHCP CLC layer 315 is transparent due to the application of an electrical potential V2. The LHCP portion 750 of the incident outside light 730 is reflected by LHCP CLC layer 320 while the RHCP portion 765 passes completely through the ESM. RHCP portion 755 of the incident display light 745 passes through the ESM while the LHCP portion 760 is reflected by LHCP CLC layer 320.

Lower ESM 240 and upper ESM 270 from FIG. 2 can each be switched between a primarily reflective state, a primarily transparent state, and an intermediate state, represented by FIG. 7A, FIG. 7B, and FIG. 7C respectively. When lower ESM 240 and upper ESM 270 are both in the reflective state represented by FIG. 7A, the periscope operates as a conventional prior art periscope, providing an optical view of the outside represented by light ray 180 in FIG. 2. When lower ESM 240 and upper ESM 270 are both in the transparent state represented by FIG. 7B, the periscope provides a display view represented by light ray 220 in FIG. 2. When upper ESM 270 is in the reflective state represented by FIG. 7A and lower ESM 240 is in the intermediate state represented by FIG. 7C, the periscope provides a combined view of both the outside represented by light ray 180 in FIG. 2 and the display view represented by light ray 220 in FIG. 2. Approximately 50% of the light from each of the two views reaches the crewmember's eye 160. The purpose of upper ESM 270 is to reduce the residual amount of outside light that reaches the crewmember's eye when in display mode. For example, if a single ESM has a 5% residual reflection when it is in transparent mode, two ESMs in series will have a 0.25% total residual reflection. This is important as 5% of a bright outside light would significantly interfere with the display view.

The ESMs can also be used to dim the outside view in cases of bright ambient lighting conditions by, for example, making one layer of upper ESM 270 transparent. This will result in an approximately 50% reduction in brightness of the outside view. Likewise, in combined mode, one layer of upper ESM 270 can be made transparent to reduce the brightness of the outside portion of the view to equalize the brightness of these two components of the combined view.

The ESMs can also be used to block light originating inside the vehicle from passing through the periscope to the outside where it could be detected by enemy forces. To accomplish this, all ESM layers would be made transparent.

FIG. 8 shows plots of driving voltage V and the resulting optical transmission T for the LHCP and RHCP layers of the ESM and the resulting total optical transmission T for the two layers together. All values are normalized to 0 to 1 or −1 to +1 scales. Direct current power will cause the CLC ESM to switch but will eventually result in degradation of the device due to migration of particles to either the plus or minus electrode. Therefore, an alternating current is used. A square wave is preferred over a sine wave as optical transmission of the ESM is related to the voltage and a square wave has a greater average absolute value voltage level compared to a sine wave of the same peak voltage value. The plots in the left column represent the case where the two layers of the ESM are driven by identical square waves. The plot at the bottom left represents the total optical transmission for the two layers together. Note that at each voltage transition, the total optical transmission dips significantly. This effect is noticeable to the user as a visible flicker when the square wave frequency is less than approximately 60 Hz.

The plots in the right column represent the case where the LHCP and RHCP layers of the ESM are driven at half the frequency but with a phase offset of 90 degrees. The resulting total optical transmission, in the lower right plot, has the same visual frequency from half the square wave frequency and the magnitude of the dip in optical transmission is also half. Power consumption of a layer of the CLC ESM is approximately proportional to the square wave frequency. Therefore, 90 degree phase shifted 30 Hz square wave inputs produce the same or better visual effect with approximately half the power consumption of in-phase 60 Hz square wave inputs. This scheme is used in the preferred embodiment of the invention. Several methods for producing the described phase-shifted square wave are well known to those knowledgeable in the art.

FIG. 9 shows a cross-section of just the area of the projection path. Projection rays 910 are emitted by projector 260, enter projection prism 210 via projection lens 250, reflect off mirrored surface 280, and are diffusely reflected by projection screen 230. The image projected on projection screen 230 is then visible to the eye of the crewmember 160. The three depicted rays of projection rays 910 represent the upper and lower extents of the projected image and the midpoint. Projection image ray 220 represents a single ray of light from a single pixel of the projected image. A front projection system is shown but rear projection, where the light is projected onto the side of the projection screen away from the viewer, is also possible.

ALTERNATIVE EMBODIMENTS

FIG. 10 represents an alternative embodiment in which the upper ESM has been removed and replaced by reflective coating 115 on the angled surface of upper prism 110. This embodiment has the advantage of easier assembly and lower cost but requires that the remaining lower ESM 240 have a much smaller residual reflection when in transparent mode.

FIG. 11 represents an alternative embodiment in which the upper ESM has been removed and replaced by reflective coating 115 on the angled surface of upper prism 110 and Electronically Switchable Shade (ESS) 1110 has been added. The ESS has the property of being transparent or opaque depending on the applied electrical potential. AlphaMicron, Inc. in Kent, Ohio is one available source for such a device which they term Variable Attenuation Liquid Crystal Device (VALiD) which is used, for example, in ski goggles with electronically variable light attenuation. AlphaMicron's devices have the desired behavior of being clear when no power is applied. ESS 1110 can be placed at the entrance face as shown in FIG. 11 or it can be placed in air gap 135. Retaining brackets 1120 and 1130 are used to hold ESS 1110 in place. Upper ESM 270, from FIG. 2, which must be optically coupled to the upper prism 110 and is therefore difficult to replace in case of failure, is eliminated. ESS 1110 does not need to be optically coupled to upper prism 110 so it is more easily removed and can be located in a place with easier access for maintenance. A suitable device for ESS 1110 should be substantially transparent with the power off and be capable of blocking on the order of 90% of the light when power is on.

FIG. 12 represents an alternative embodiment in which the projector, projection screen, and projection lens have been eliminated and replaced with Flat Panel Display (FPD) 1210. The projection prism has been replaced with alternative display prism 1220. FPD 1210 could be a Liquid Crystal Display (LCD), Organic Light-Emitting Diode (OLED), or other suitable technology. This embodiment has the disadvantage of greater space claim in the area of the FPD but the advantage of the elimination of space claim where the projector was located in FIG. 2. Depending on the application, more space may be available in one location than the other.

Either of the two different methods of mounting the upper and lower ESMs shown in FIG. 5 and FIG. 6 could be used on either ESM. FIG. 13 represents an alternative embodiment wherein lower ESM 240 is mounted using a modification of the method shown in FIG. 6 for the upper ESM. Lower ESM 240 is mounted to both lower prism 120 and display prism 210 with the same flexible adhesive 1310. In addition, a stiffer structural connection between the two prisms is made with metal seal 640 or glass seal 610 or a combination thereof. The bulk of the shock forces are borne by the stiffer seals 640 and 610, thereby isolating lower ESM 240 from high shock forces. This alternative embodiment eliminates the possibility of leakage of the optical fluid cavity as in the preferred embodiment while still providing the necessary thermal and shock isolation features.

Two alternatives to a CLC ESM are an electrochromic ESM such as is described in U.S. Pat. No. 5,905,590 or an electrochemical ESM such as is described in U.S. Pat. No. 5,923,456. Such devices would also be composed of transparent substrates with transparent electrode coatings with an active material between. Such devices could be mounted in the same manner as has been described for the CLC ESM.

FIGS. 14 through 18 show various embodiments of a periscope according to the present invention, wherein the embodiments shown in FIGS. 14 through 18 are collimated variants of the multi-purpose periscope with display and overlay capabilities described above. It should be noted that like numerals indicate like parts. The basic periscope and the view switching are generally identical between the periscope in the embodiments as described above and those for the collimated variants of the multi-purpose periscope as described hereafter. Generally, the only difference is that the simple display of the previous embodiments is replaced with a display plus optics assembly, which collimates the display image, thus providing benefits to the user of the periscope. One of these benefits may include that the user's eyes may focus at infinity when viewing a collimated display. This will differ from the displays as described in the above embodiments of the periscope, where the user's eyes had to focus at the actual location of the display which in some instances can be close enough to cause eye strain depending on the placement of the periscope and the user's position relative thereto. Furthermore, collimation generally will eliminate parallax error between the display and outside view when in a combined view mode. One example of such is that it is contemplated to draw a box on the display intended to indicate the location of an enemy vehicle. With the collimated display as described herein, the box would surround the enemy vehicle no matter where the viewer's head position is in relation thereto. However, with the previously described periscopes having the uncollimated variant, the box would appear to move with respect to the enemy vehicle as the viewer's head position is moved with relation to the periscope. Hence, conformal overlay applications such as target boxes generally operate better and tend to require a collimated display. Other advantages and benefits of the collimated variants of the multi-purpose periscope will be described herein and may also include other benefits and objects not disclosed in the present application.

One alternate embodiment of the periscope having a collimated optical assembly arranged therein is shown in side view in FIG. 14. The periscope is arranged generally the same as that described above for FIG. 12 and includes some of the same components as that shown in FIG. 12 above, such components will not be further described herein. Within the housing 130 of the periscope embodiment shown in FIG. 14 is arranged a collimating optical assembly. This collimating optical assembly 1420 is arranged adjacent to the display prism 1220 of the periscope all within the housing 130 of the periscope. The collimating optical assembly 1420 generally includes a simple double convex lens 1410. This double convex lens 1410 is arranged between the display prism 1220 and the flat panel display 1210 of the periscope. The flat panel display 1210 is arranged a predetermined distance from the double convex lens 1410 because of the f-number and the required distance between the display and the lens 1410. It should be noted that the double convex lens 1410 may be glued or fastened by any other known mechanical or chemical fastening technique to any surface of the display prism 1220 or the housing 130. In the embodiment shown a side surface of the display prism 1220 is used as a connecting surface for the double convex lens 1410 of the collimating optical assembly 1420. However, it should be noted that the double convex lens 1410 may be arranged in other positions relative to the display prism 1220 depending on the design requirements and the shape of the periscope housing 130 and the vehicle in which it is used. Any known type or variety of double convex lens 1410 may be used in the embodiment shown in FIG. 14. It should also be noted that the embodiment shown has a laser filter 140 arranged at the entrance face of the periscope and a protective face plate 150 arranged over the exit opening of the periscope, however these may or may not be included depending on the environment in which the periscope will be used. It should be noted that the collimating optical assembly 1420 of FIG. 14 may cause a display image to appear focused at or near infinity and eliminates the parallax effect between the display imagery and the outside view.

FIG. 15A shows a bottom view of the optical system of FIG. 14. This view shows that the optical system is generally significantly wider than tall due to the shape of the exit window of a common ground combat vehicle periscope. This view also shows the size of the overall optical system and the fact that there are practical limits on the f-number, i.e., the distance from the display to the lens divided by the diameter of the lens of an optical system. Thus, generally the collimated versions of the periscope will require a larger space requirement than that of the periscopes described in the previous embodiments. As shown in FIG. 15B, one method to reduce the size of the periscope and overall housing 130 for the periscope is to create a binocular embodiment of the collimated optical assembly 1420 using first and second double convex lenses 1410. By dividing the total eye box of the periscope into two optical systems the total size of the optical system is significantly reduced. As shown in FIG. 15B, the distance needed between first and second flat panel display 1210 and first and second double convex lens 1410 is reduced from that of the embodiment shown in FIG. 15A and FIG. 14. It should further be noted that this binocular embodiment may also be used for the other embodiments of the periscopes incorporating collimated optical assemblies described hereafter.

FIG. 16 shows yet another embodiment of a periscope having a collimated optical assembly 1420 arranged therein. This embodiment shows a combination of lenses and mirrors which will accomplish the same function as the simple double convex lens 1410 embodiment described above, however it will do it with greater image quality and smaller total space for the periscope. The embodiment shown in FIG. 16 includes a half wave plate 1610 arranged adjacent to the flat panel display 1210. It should be noted that the half wave plate 1610 is an optional portion of the collimated optical assembly 1420 and may not be used depending on the design requirements and the polarization characteristics of the selected flat panel display. Arranged directly adjacent to the half wave plate 1610 is a field lens 1620. The field lens 1620 is then arranged adjacent to a lower beam splitter prism 1630. The lower beam splitter prism 1630 in its side view generally may have a triangular shape. Arranged adjacent to the lower beam splitter prism 1630 is a polarizing beam splitter 1640. It should be noted that it is also contemplated to use a non-polarizing beam splitter in the collimated optical assembly 1420. This polarizing beam splitter 1640 may be arranged on one surface of the lower beam splitter prism 1630 and secured via either a glue or any other known chemical fastening or mechanical fastening technique, such as any of those described above. The collimating optical assembly 1420 also may include an upper beam splitter prism on a side opposite to that of the lower beam splitter prism 1630. The collimating optical assembly 1420 may also include a quarter wave plate 1660 secured to one surface of the upper beam splitter prism 1650. It should be noted that the quarter wave plate 1660 is also optional and may not be used in the collimating optical assembly 1420 depending on the design requirements and environment in which the periscope will be used. Attached to one side of the quarter wave plate 1660 is a lens 1670. Adjacent to the lens 1670 is a concave first surface mirror 1680 or diffractive element. The concave first surface mirror 1680 may be arranged a predetermined distance from the lens 1670 and may be secured to the lens 1670 with a predetermined gap by any known glue, epoxy or any other known chemical or mechanical fastening technique that can be used between two optical components. The collimating optical assembly 1420 also may include a corrector prism 1690 that may be arranged directly adjacent to an upper surface of the upper beam splitter prism 1650. It should be noted that the corrector prism 1690 may be secured to the upper beam splitter prism 1650 with any known connecting methodology, either chemical or mechanical known for connecting two optical components to one another. Generally, one surface of the corrector prism 1690 may be directly adjacent to one surface of the display prism 1220 of the periscope as shown in FIG. 16. Also, it should be noted that in the embodiment shown flat panel display 1210 may be arranged directly below display prism 1220. However, any other positioning may be used for the flat panel display 1210 and the associated collimating optical assembly 1420 depending on the design requirements and shape of the housing 130 which encloses the periscope as described herein. It should be noted that the half wave plate 1610 may be bonded to the flat panel display 1210 and/or the field lens 1620 depending on the design requirements. Furthermore, the polarizing beam splitter 1640 may be bonded between the lower beam splitter prism 1630 and the upper beam splitter prism 1650. Also, in the embodiment shown quarter wave plate 1660 may be bonded between the upper beam splitter 1650 and the lens 1670. Furthermore, corrector prism 1690 may be bonded to the upper beam splitter prism 1650 as described above.

In one contemplated embodiment any known elastic material, such as but not limited to a two part room temperature vulcanized (RTV) rubber 190 may be used to secure and cushion the assembly of the lower beam splitter prism 1630, the polarizing beam splitter 1640, the upper beam splitter 1650, the quarter wave plate 1660, lens 1670, and the corrector prism 1690 within the housing 130, as shown in FIG. 16. This elastic material 190 may allow for the collimating optical assembly 1420 to operate properly within the environment in which the periscope will be used. In one contemplated embodiment the concave first surface mirror 1680 may also be secured by elastic material 190 or in another contemplated embodiment may be mounted within an adjustable mechanism for aligning and focusing the optics within the periscope. This adjustable mechanism may be any known mechanical technique or apparatus known for mounting and securing optical components to ensure proper alignment and use of the optical components within the periscope environment. As shown in the embodiment in FIG. 16, the flat panel display 1210, the optional half wave plate 1610 and the field lens 1620 may similarly be secured and fastened within the periscope housing 130 by elastic material 190. However, in another contemplated embodiment these components may be mounted within an adjustable mechanism within the housing 130 which will align and focus the optics as necessary within the environment in which the periscope will be operated. It should also be noted that any other known plastic, rubber, elastic, ceramic, composite, metal, natural material, or any other material may also be used to perform the securing and cushioning of the collimating optical assembly 1420 within the housing 130 depending on the design requirements and environment in which the periscope will be used. The use of the RTV rubber is just one contemplated embodiment for use in protecting and securing the collimating optical assembly 1420. It should further be noted that any other known glue, caulk or any other known chemical or mechanical fastening technique may be used to secure any of the parts to one another within the collimating optical assembly 1420 and/or to all of the other components within the housing 130 of the periscope.

In operation, the embodiment shown in FIG. 16 may take linearly polarized display light 220 which is emitted by flat panel display 1210 and direct that through half wave plate 1610 which will turn the polarization of the display light 220 to the P direction. Next, the field lens 1620 may take the display light 220 and flatten the field image of the light being emitted from the flat panel display 1210. Then the P polarized display light will be transmitted by the polarized beam splitter 1640 into quarter wave plate 1660, which will convert the P polarized display light 220 into a circularly polarized state. Next, the circular polarized light will enter lens 1670 and concave mirror 1680 to collimate the display light 220. Then the circularly polarized light 220 will be converted to circularly polarized light of the opposite direction by reflection off of the concave mirror 1680 wherein next the light is converted to S polarized light by the quarter wave plate 1660. The light then is reflected by the polarizing beam splitter 1640 up into the corrector prism 1690. In the corrector prism 1690, the aspheric curved surface thereof corrects for distortions and other image defects, thus producing a high quality collimated image which will pass essentially unaltered through the display prism 1220, the lower electronic switchable mirror 240, the lower prism 120 and the exit face plate 150 to the eyes of the user. It should further be noted that in the embodiment shown in FIG. 16, all of the curved surfaces in the optical system may be either spherical or aspherical depending on the design of the periscope and the environment in which it will be used.

FIG. 17 shows yet another embodiment of a collimated periscope according to the present invention. Generally, the basic elements of the collimated embodiment shown in FIG. 16 are rearranged and used in the embodiment shown in FIG. 17. However, in the embodiment shown in FIG. 17 the lower electronically switchable mirror 240 may be used to fold the optics instead of the polarizing beam splitter 1640 of the embodiment shown in FIG. 16. However, it should be noted that the lower electronically switchable mirror 240 may be used in the intermediate mode as described above for the user to see the display as it acts as a polarizing beam splitter in that mode. The embodiment shown in FIG. 17 generally may have the flat panel display 1210 arranged below a surface of the display prism 1220 a predetermined distance from the display prism 1220. This distance may be based on the focal length of the optical system and is constrained to a practical f-number. In the embodiment shown in FIG. 17 the flat panel display 1210 flat front surface may be parallel to a bottom surface of the display prism 1220. However, the flat panel display 1210 may also be oriented at different angles with respect to the bottom surface or any other surface of the display prism 1220 depending on the design requirements. Arranged directly adjacent to the flat panel display 1210 may be a half wave plate 1610. It should be noted that the half wave plate 1610 is an optional portion of the collimated optical assembly 1420 and may not be used depending on the design requirements and the polarization characteristics of the selected flat panel display. Arranged directly adjacent to the half wave plate 1610 may be a field lens 1620. The field lens 1620 may be secured to the half wave plate 1610 by any known glue or any other chemical or mechanical fastening technique known for connecting optical components to one another. Arranged directly adjacent to the field lens 1620 may be a lens 1670 which is a double convex lens, this lens 1670 needs to be separated from the concave mirror or diffractive element 1680 by a predetermined distance. In the embodiment shown, the concave mirror or diffractive element 1680 is arranged adjacent to a side surface of the display prism 1220. It should be noted that concave mirror 1680 may perform the correction in place of the correcting prism 1690 of the above embodiment. It should further be noted that the embodiment shown in FIG. 17 may also include a quarter wave plate 1660 arranged directly adjacent to the side surface of the display prism 1220 as shown in FIG. 17. This quarter wave plate 1660 may be arranged between the display prism 1220 and the concave mirror 1680 as shown. It should be noted that the quarter wave plate 1660 is optional and may not be used in the collimating optical assembly 1420 depending on the design requirements and environment in which the periscope will be used. It should be noted that one advantage of the embodiment shown in FIG. 17 is a smaller space requirement for the housing 130 and periscope within the vehicle it is being used. As shown in FIG. 17 the linear polarized display light 220 will exit the flat panel display 1210 and pass through the half wave plate 1610, the field lens 1620 and the double convex lens 1670 until it reaches the lower electronically switchable mirror 240. The mirror 240 then reflects the light through the quarter wave plate 1660 and off of the concave mirror 1680. Then the reflected light in its collimated state passes back through the quarter wave plate 1660 and the lower electronically switchable mirror 240 to the user of the periscope 160. This accomplishes the same collimated image as shown in FIG. 16 but with a smaller package size for the housing 130 of the periscope.

FIG. 18 shows yet another embodiment of a collimated optical assembly 1420 for use in a periscope according to the present invention. In this embodiment the optical path is folded further within the housing 130 of the periscope to decrease the necessary space within the vehicle for the periscope. Generally, this embodiment will increase the f-number of the optical system which will allow for the lens and the corrector elements to be eliminated from the collimating optical assembly 1420. In this embodiment the lower electronically switchable mirror 240 may be used as a polarizing beam splitter in order to fold the optical system. This embodiment as shown in FIG. 18 generally may have the flat panel display 1210 arranged below a lower surface of the display prism 1220. Generally, the flat panel display 1210 may have its image displaying face parallel to the bottom surface of the display prism 1220. Arranged directly adjacent to the flat panel display 1210 may be a half wave plate 1610. It should be noted that the half wave plate 1610 is an optional portion of the collimated optical assembly 1420 and may not be used depending on the design requirements and the polarization characteristics of the selected flat panel display. It should also be noted that the half wave plate 1610 may also be directly secured to the flat panel display 1210 by any known optical connecting methodology. Arranged adjacent to the half wave plate 1610 may also be a field lens 1620. The field lens 1620 may be secured to the half wave plate 1610 by any known optical connecting methodology or may be arranged a predetermined distance there from. Generally, the field lens 1620 may be arranged a predetermined distance from the bottom surface of the display prism 1220. It should be noted that the display prism 1220 may be in contact and secured to the field lens 1620 with any known optical connecting methodology and material. The optical assembly 1420 of the embodiment shown in FIG. 18 also may include a powered color sensitive reflector 1810 which is arranged within the housing 130 of the periscope. In the embodiment shown, the powered color sensitive reflector 1810 is arranged within the upper prism 110 at a predetermined position therein. It should be noted that the powered color selective reflector 1810 in the embodiment shown is a coating on an embedded curved surface of the upper prism 110. However, it is also contemplated to be used as a coating on an air spaced meniscus lens or a flat refractive device. The collimated embodiment shown in FIG. 18 also may include a quarter wave plate 1660 arranged between the lower electronically switchable mirror 240 and the powered color selective reflector 1810. It should be noted that the quarter wave plate 1660 is optional and may not be used in the collimating optical assembly 1420 depending on the design requirements and environment in which the periscope will be used. In the embodiment shown the quarter wave plate 1660 is arranged within the gap between the upper prism 110 and the lower prism 120. In another contemplated embodiment the quarter wave plate 1660 may either be embedded within or bonded to a surface of the upper prism 110 and/or the lower prism 120. In operation, the collimated periscope of FIG. 18 will take linearly polarized display light that is emitted from the flat panel display 1210 and pass it through the half wave plate 1610 and the field lens 1620, which then will pass the light through the lower electronically switchable mirror 240 until it reflects off of the powered color selective reflector 1810, which will then reflect the display light back to the lower electronically switchable mirror 240 which in turn will reflect the light to the exit face and to the user of the collimated periscope. It should be noted that for all of the embodiments described in FIGS. 1 through 18 any known metal, ceramic, composite, plastic, glass or natural material may be used for any of the parts disclosed therein.

CONCLUSION, RAMIFICATIONS, AND SCOPE

Accordingly, the reader will see that the multi-purpose periscope of this invention can be used to provide display and combined view modes in addition to the normal outside view of a conventional periscope. The display mode can be used to inject a simulated view into the periscopes for embedded training, display video from daylight or FLIR cameras, display a map, or present any other video-based information. The combined mode can be used to overlay vehicle data, target indicators, lane markers, etc onto the outside view. The invention can also be used to provide dimming of the outside view in the event of very bright ambient lighting conditions. The device has no moving parts that could wear out and fail. Any electronic failures would still allow use in the most critical mode: the outside view mode.

While the above description contains many specifics, these should not be construed as limitations on the scope of the invention. For example, the projector could be positioned in a variety of locations; the various ESM technologies could be used in various combinations and arrangements; etc.

Thus, the scope of the invention should be determined by the appended claims and their legal equivalents and not by the examples given.

What is claimed is:

1. A collimated periscope, said periscope comprising:
   a housing;
   an upper prism arranged within said housing;
   a lower prism arranged adjacent to said upper prism;
   a display prism arranged adjacent to said lower prism;
   a collimating optical assembly arranged adjacent to said display prism;
   a flat panel display arranged adjacent to said collimating optical assembly;
   an electronically switchable mirror arranged on a surface of said lower prism; and
   said collimating optical assembly comprises:
   a field lens arranged adjacent to said flat panel display;
   a lower beam splitter prism arranged adjacent to said field lens;
   a beam splitter arranged adjacent to said lower beam splitter;
   an upper beam splitter prism arranged adjacent to said beam splitter;
   a lens arranged adjacent to said upper beam splitter prism;

a concave first surface mirror arranged adjacent to said lens; and a corrector prism arranged adjacent to said upper beam splitter prism and said display prism.

2. The periscope of claim 1 wherein said beam splitter is a polarizing beam splitter.

3. The periscope of claim 1 wherein said beam splitter is a non-polarizing beam splitter.

4. The periscope of claim 1 wherein said collimating optical assembly further comprises a half wave plate arranged between said flat panel display and said field lens.

5. The periscope of claim 2 wherein said collimating optical assembly further comprises a quarter wave plate arranged between said upper beam splitter prism and said lens.

6. The periscope of claim 1 further comprising an exit face plate.

7. The periscope of claim 1 further comprising a laser filter arranged at an entrance face of the periscope.

8. The periscope of claim 1 further comprising a gap having a predetermined size arranged between said upper prism and said lower prism.

9. A collimated periscope, said periscope comprising:
a housing;
an upper prism arranged within said housing;
a lower prism arranged adjacent to said upper prism;
a display prism arranged adjacent to said lower prism;
a collimating optical assembly arranged adjacent to said display prism;
a flat panel display arranged adjacent to said collimating optical assembly;
an electronically switchable mirror arranged on a surface of said lower prism; and
a second flat panel display and a second collimating optical assembly each arranged within said housing.

10. The periscope of claim 9 wherein said collimating optical assembly comprises a double convex lens arranged between said flat panel display and said display prism.

11. A collimated periscope, said periscope comprising:
a housing;
an upper prism arranged within said housing;
a lower prism arranged adjacent to said upper prism;
a display prism arranged adjacent to said lower prism;
a collimating optical assembly arranged adjacent to said display prism;
a flat panel display arranged adjacent to said collimating optical assembly;
an electronically switchable mirror arranged on a surface of said lower prism; and
said collimating optical assembly comprises:
a field lens arranged adjacent to said flat panel display;
a lens arranged adjacent to said field lens; and
a concave mirror arranged adjacent to said display prism.

12. The periscope of claim 11 wherein said collimating optical assembly comprising a half wave plate arranged adjacent to said flat panel display.

13. The periscope of claim 11 wherein said collimating optical assembly comprising a quarter wave plate arranged adjacent to said display prism.

14. The periscope of claim 11 wherein said electronically switchable mirror is in an intermediate mode which allows a predetermined amount of outside light to be reflected and a predetermined amount of outside light to pass through.

15. A collimated periscope, said periscope comprising:
a housing;
an upper prism arranged within said housing;
a lower prism arranged adjacent to said upper prism;
a display prism arranged adjacent to said lower prism;
a collimating optical assembly arranged adjacent to said display prism;
a flat panel display arranged adjacent to said collimating optical assembly;
an electronically switchable mirror arranged on a surface of said lower prism; and
said collimating optical assembly comprising:
a field lens arranged adjacent to said display prism; and
a powered color selective reflector arranged within said housing.

16. The periscope of claim 15 wherein said collimating optical assembly comprising a half wave plate arranged adjacent to said flat panel display.

17. The periscope of claim 15 wherein said collimating optical assembly comprising a quarter wave plate arranged between said electronically switchable mirror and said powered color selective reflector.

18. The periscope of claim 15 wherein said powered color selective reflector is a coating on an embedded curved surface, a coating on an air spaced meniscus lens or a flat diffractive reflector device.

19. The periscope of claim 17 wherein said quarter wave plate is embedded within or bonded to a surface of said upper prism or said lower prism.

20. A method of collimating a display image of a periscope, said method comprising the steps of:
emitting linearly polarized or non-polarized light from a flat panel display arranged within a housing of the periscope:
flattening a field of an image of said light with a field lens;
transmitting said light with a beam splitter;
collimating said light with a lens and concave mirror;
reflecting said light with said beam splitter;
correcting said image for distortions with a corrector device; and
displaying said collimated image to a user of the periscope through an exit face.

21. The method of claim 20 further comprising the step of correcting said light to a predetermined linear polarized state with a half wave plate.

22. The method of claim 20 wherein said beam splitter is polarized.

23. The method of claim 22 further comprising the step of correcting a polarization of said light to a circular state with a quarter wave plate.

24. The method of claim 20 further comprising the step of using a binocular collimating system to reduce a packaging size of the periscope.

25. The method of claim 20 wherein said concave mirror is replaced with a powered color selective reflector for reflecting said light within the periscope.

26. The method of claim 20 wherein said concave mirror is replaced with a diffractive element.

27. The periscope of claim 1 further comprising a second electronically switchable mirror arranged on a surface of said upper prism.

28. The periscope of claim 9 further comprising a second electronically switchable mirror arranged on a surface of said upper prism.

29. The periscope of claim 11 further comprising a second electronically switchable mirror arranged on a surface of said upper prism.

30. The periscope of claim 15 further comprising a second electronically switchable mirror arranged on a surface of said upper prism.

31. The periscope of claim 1 further comprising a second flat panel display and a second collimating optical assembly each arranged within said housing.

32. The periscope of claim 31 further comprising a second electronically switchable mirror arranged on a surface of said upper prism.

* * * * *